March 1, 1927.

F. L. FULLER ET AL 1,619,664

CASH REGISTER

Filed July 9, 1920      9 Sheets-Sheet 4

Inventors
Frederick L. Fuller &
William H. Robertson

March 1, 1927.
F. L. FULLER ET AL
CASH REGISTER
Filed July 9, 1920
1,619,664
9 Sheets-Sheet 5
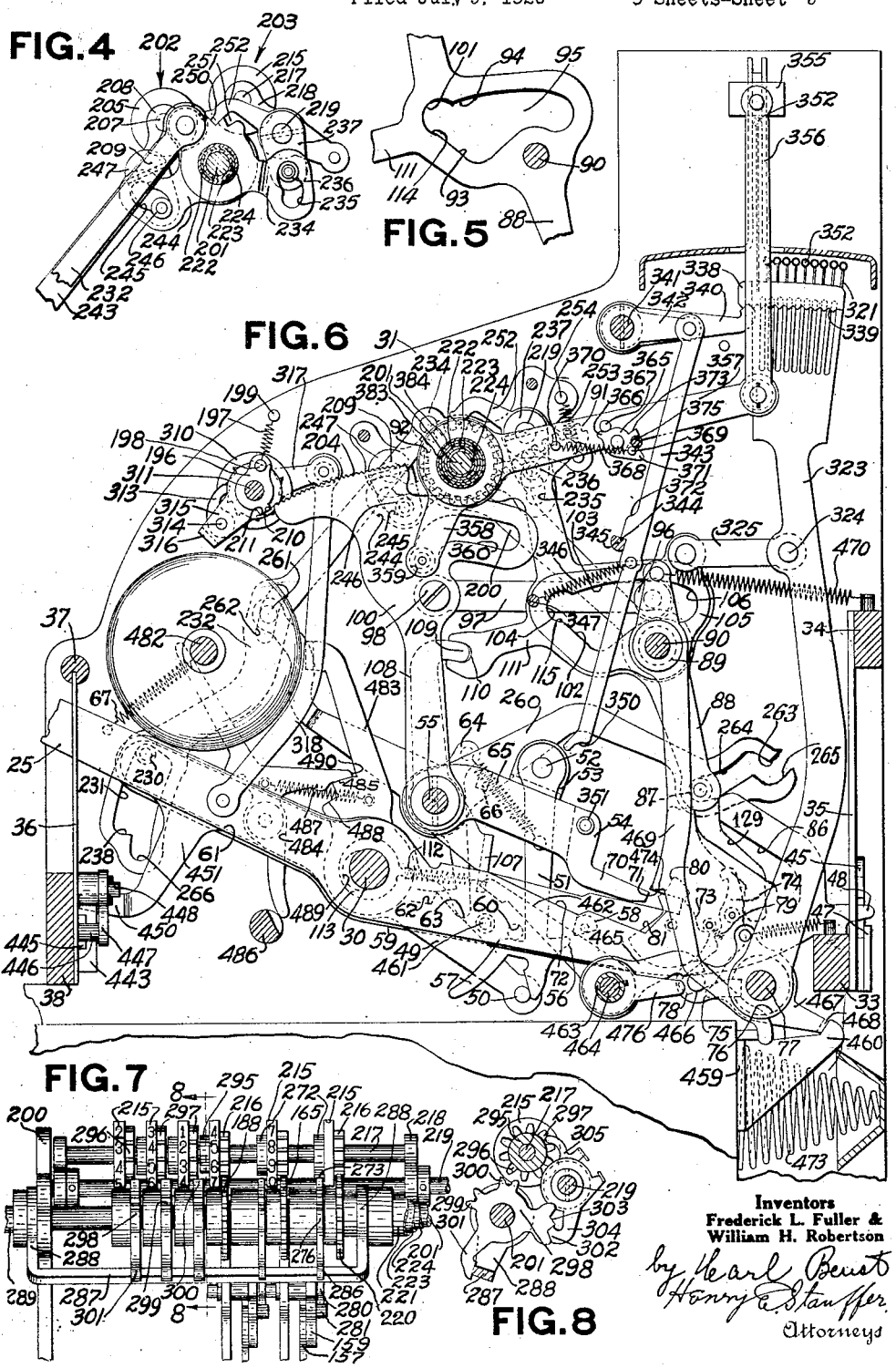
Inventors
Frederick L. Fuller &
William H. Robertson
Attorneys

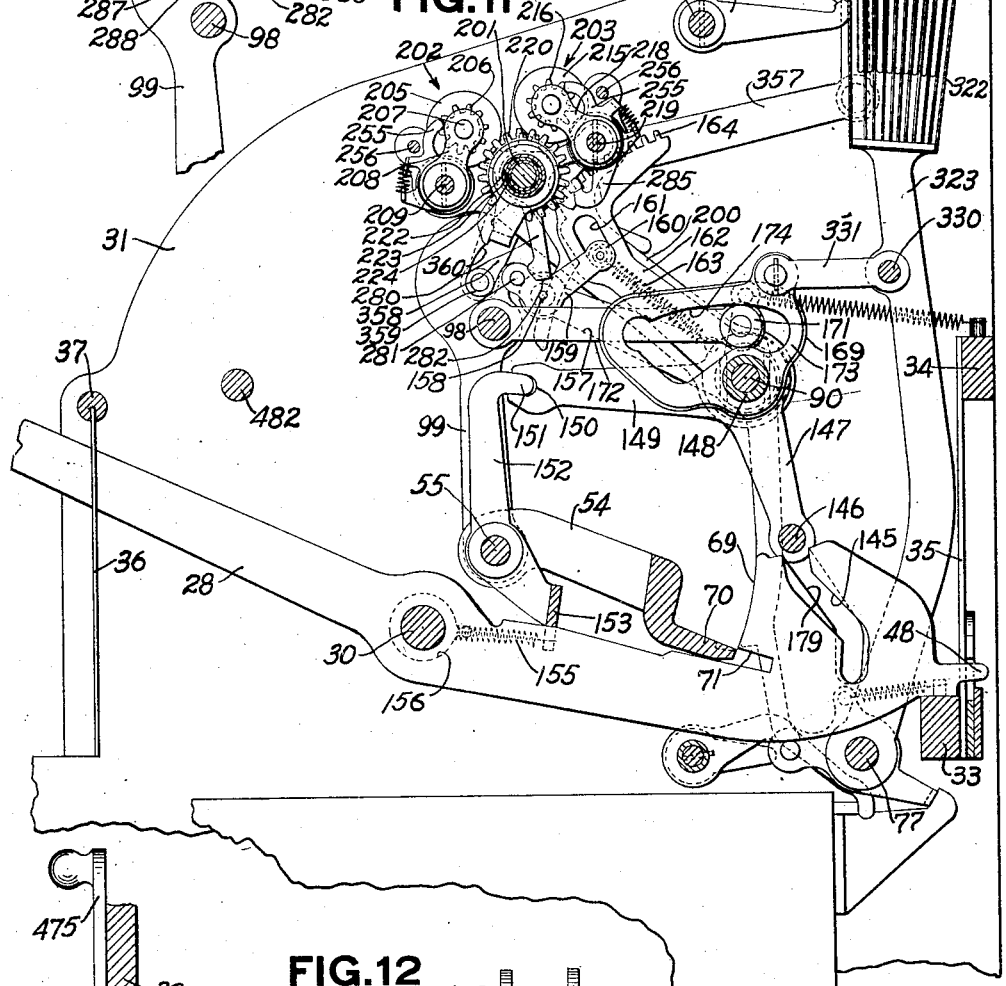
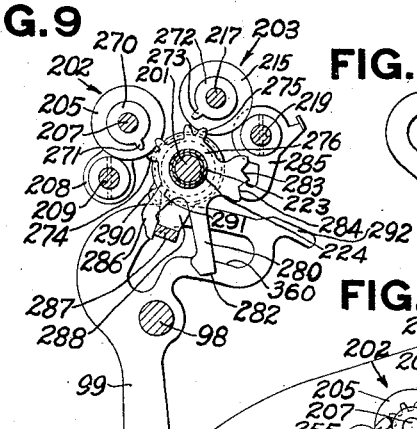
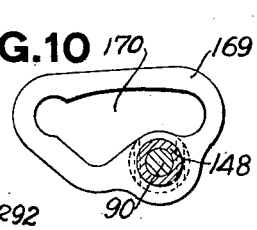
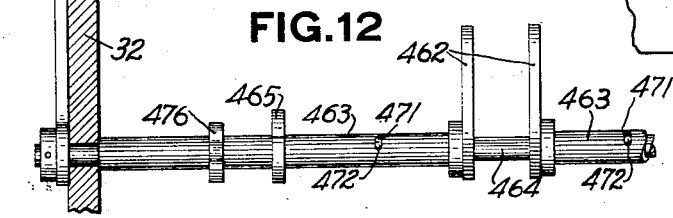

March 1, 1927.
F. L. FULLER ET AL
1,619,664
CASH REGISTER
Filed July 9, 1920   9 Sheets-Sheet 7
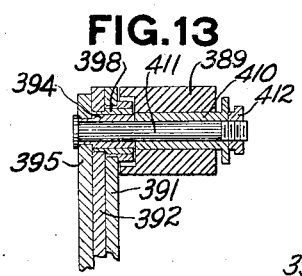
FIG. 13
FIG. 14
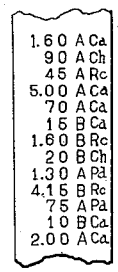
FIG. 15
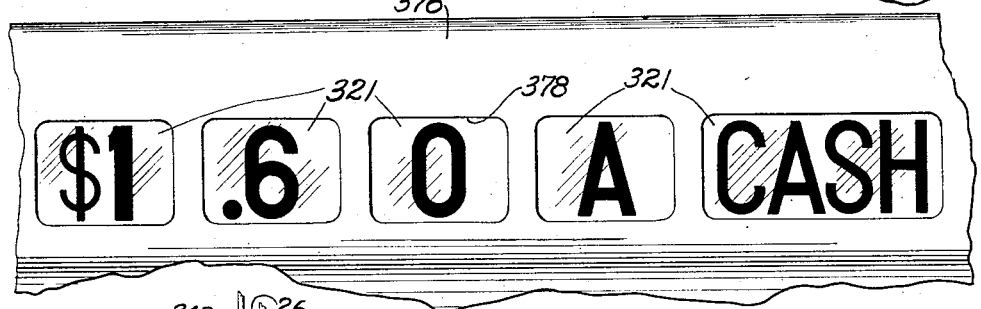
FIG. 16
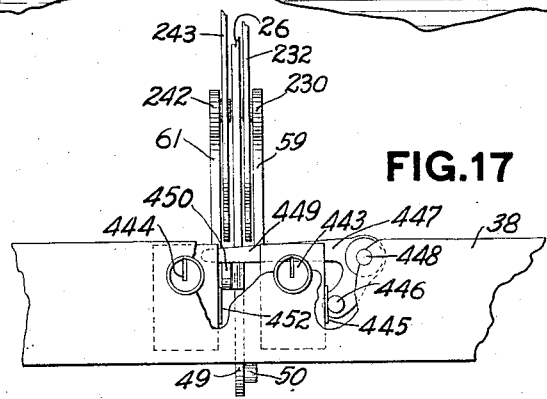
FIG. 17
Inventors
Frederick L. Fuller &
William H. Robertson
Attorneys March 1, 1927.   F. L. FULLER ET AL   1,619,664
CASH REGISTER
Filed July 9, 1920   9 Sheets-Sheet 8

Inventors
Frederick L. Fuller &
William H. Robertson

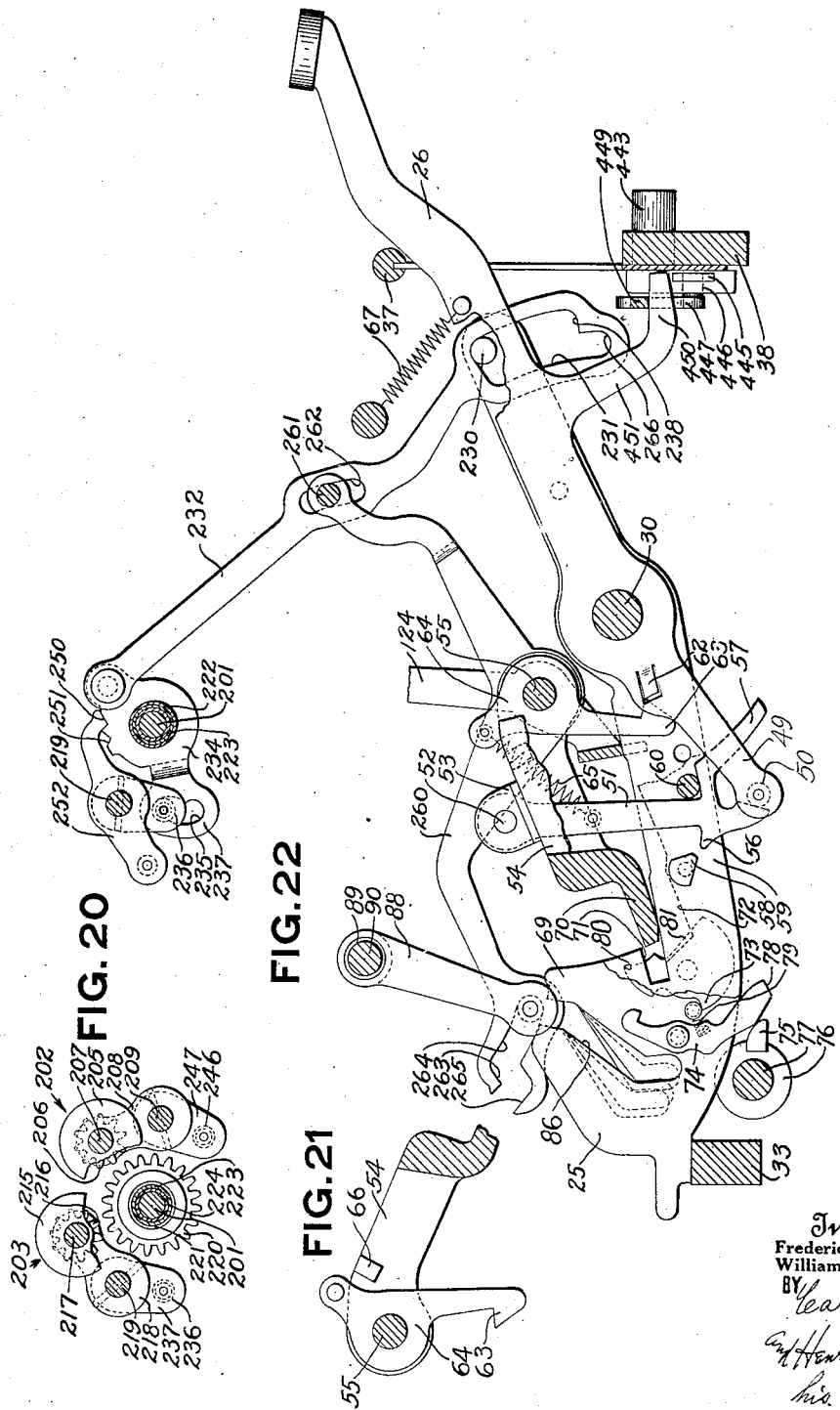
March 1, 1927.
F. L. FULLER ET AL
CASH REGISTER
Filed July 9, 1920
1,619,664
9 Sheets-Sheet 9
Inventors
Frederick L. Fuller &
William H. Robertson Patented Mar. 1, 1927.   BEST AVAILABLE COPY   1,619,664

UNITED STATES PATENT OFFICE.

FREDERICK L. FULLER, OF BRIDGEPORT, CONNECTICUT, AND WILLIAM H. ROBERTSON, OF DAYTON, OHIO, ASSIGNORS, BY MESNE ASSIGNMENTS, TO THE NATIONAL CASH REGISTER COMPANY, OF DAYTON, OHIO, A CORPORATION OF MARYLAND.

CASH REGISTER.

Application filed July 9, 1920. Serial No. 394,974.

This invention relates to cash registers and the like, and more particularly to machines of the key operated type.

The main object of the invention is to provide such machines with new indicators, which are adapted to be differentially selected and then exposed to view.

Another object is to arrange the indicators in groups and to arrange the operating keys in groups, and to provide a mechanism whereby the operation of any key in any group directly selects a corresponding indicator in that respective group.

With these and incidental objects in view, the invention consists in certain novel features of construction and combination of parts, the essential elements of which are set forth in appended claims, and a preferred form of embodiment of which is hereinafter described with reference to the drawings which accompany and form part of the specification.

Of said drawings:—

Figs. 1^A and 1^B together constitute a top plan view of the improved key operated machine, the cabinet therefor being removed.

Figs. 2^A and 2^B together constitute a rear elevation of the machine, the cabinet therefor being removed and some of the parts being broken away for the sake of clearness.

Fig. 4 is a detail view showing the means for rocking the totalizers into mesh with the actuating gears, the operating links being broken away.

Fig. 5 is a fragmentary detail view of the differential lever controlled by the transaction keys.

Fig. 6 is a sectional view on line 6—6 of Fig. 1^B, looking in the direction of the arrows.

Fig. 7 is a detail front view of one of the totalizers, and shows a part of the actuating mechanism therefor and also shows the transfer mechanism.

Fig. 8 is a detail sectional view on line 8—8 of Fig. 7, looking in the direction of the arrows.

Fig. 9 is a detail view illustrating a part of the transfer mechanism for the totalizers and also illustrating a portion of the lever which restores the transfer mechanism to normal position.

Fig. 10 is a detail view of the differential plate controlled by the dimes and dollars keys.

Fig. 11 is a sectional view on line 11—11 of Fig. 1^A, looking in the direction of the arrows.

Fig. 12 is a detail view, partly broken away, of the device for manually operating the cash drawers.

Fig. 13 is a detail sectional view of the impression platen and part of the mechanism for operating the same.

Fig. 14 is a side elevation of the printing mechanism, the side frame of the machine being broken.

Fig. 15 is a fragmentary view illustrating a portion of the detail strip as printed by the printing mechanism.

Fig. 16 is a fragmentary view illustrating the indicators.

Fig. 17 is a detail view, partly broken away, illustrating the clerks' locks and other control over the clerks' key levers.

Fig. 20 illustrates the normal position of the totalizers relative to the actuator.

Fig. 21 illustrates the retaining means for the B lever, the release for said means and a portion of the key coupler.

Fig. 22 illustrates the means for rocking B's totalizer into mesh with the actuator; the rear ends of the transaction keys and their control of said totalizer engaging means; and a portion of the clerk's key locking device.

Figure 1A:
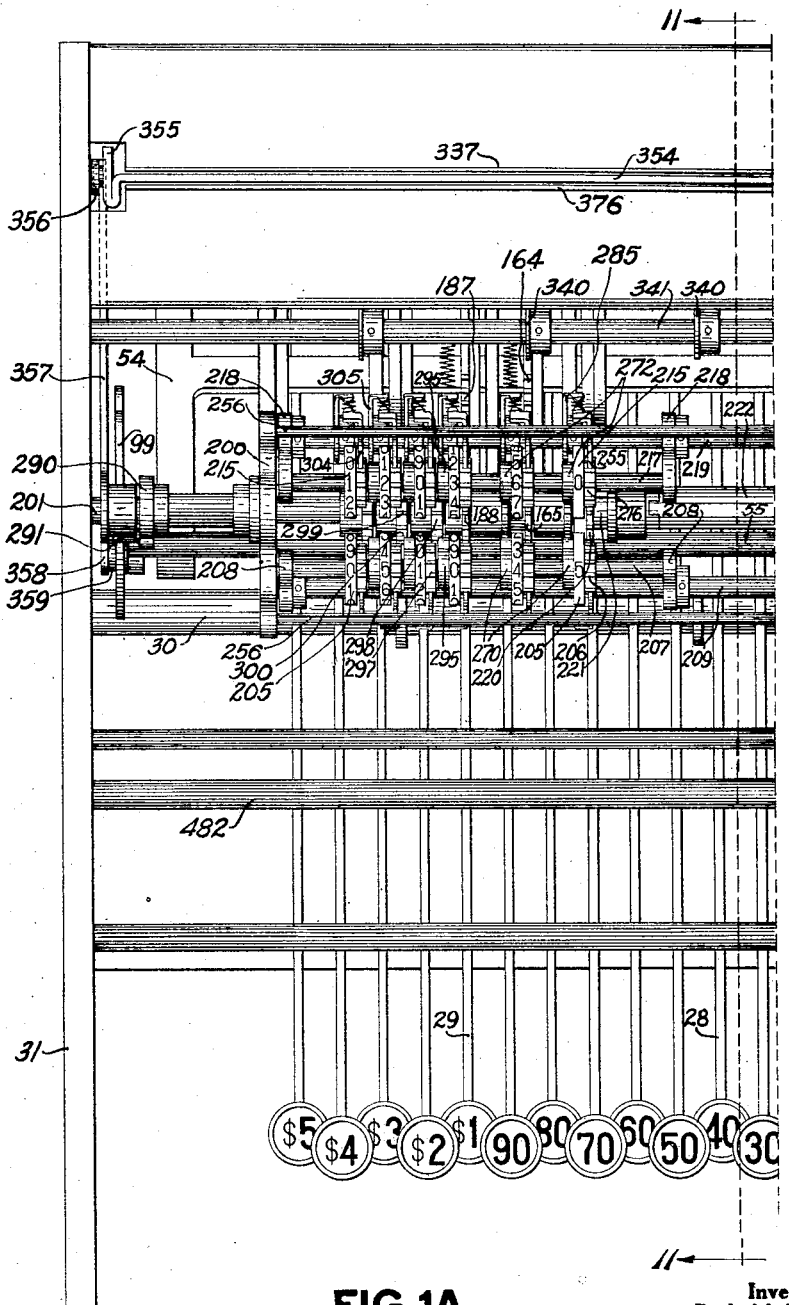

Described in general terms, the machine comprises two totalizers; actuating mechanism therefor, controlled by groups of depressible keys; an indicating mechanism selected by said keys commensurate with the value of the key which is operated; a printing mechanism for printing a detail strip; four special transaction keys, each having associated therewith a special counter to count the number of actuations of their respective keys; and a clerk's initial key.

Key-board.

Described in detail, the key-board comprises four transaction key levers 25; one clerk's initial lever 26; one "5" cent key lever 27; nine amount key levers 28 arranged from "10" cents to "90" cents; and five key levers 29 arranged from "$1" to "$5".

The transaction key levers 25 are "Cash", "Charge", "Received-on-account" and "Paid out".

Figure 1B:
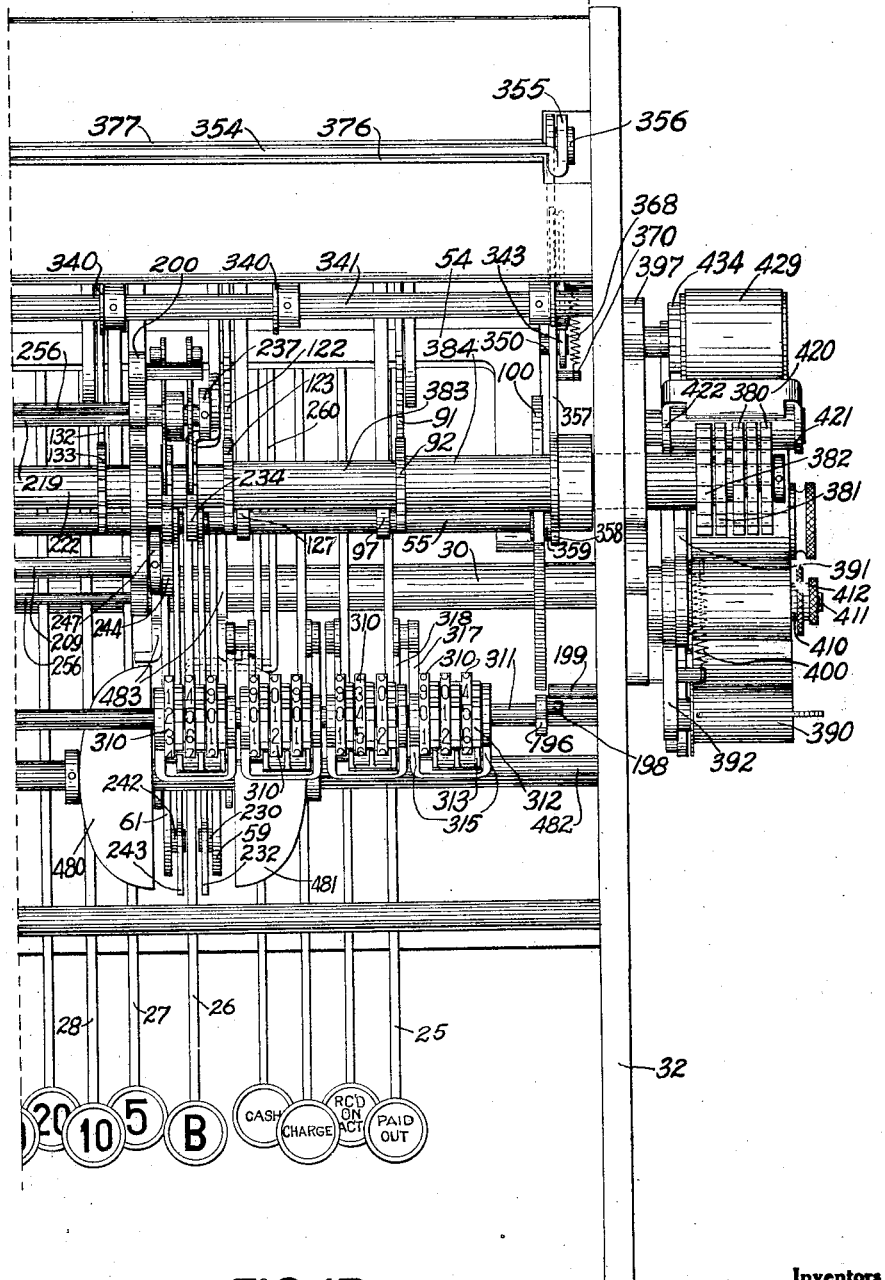

The key levers 25 to 29, inclusive, are all loosely mounted on a rod 30 (Figs. 6 and 11), carried by parallel side frames 31 and 32 (Figs. 1ᴬ, 1ᴮ, 2ᴬ and 2ᴮ).

The rear end of each of the levers 25, 27, 28 and 29, rests on a bar 33, mounted between the frames 31 and 32.

Secured to the bar 33 and to another bar 34 (Figs. 6 and 11) is a plate 35 having slots (not shown) therein, which are for the purpose of keeping the rear end of the levers in their proper lateral positions.

The forward end of the levers are held in their lateral positions by means of slots (not shown) formed in a plate 36 (Figs. 6 and 11) and mounted between a rod 37 and a bar 38, both of which are carried by the side frames 31 and 32.

The key levers 25, 28 and 29 are arranged in groups and by means to be hereinafter described, it is impossible to operate more than one key in any one group at the same time. However, any key of each of two or more groups may be simultaneously operated.

Figures 2A, 3:
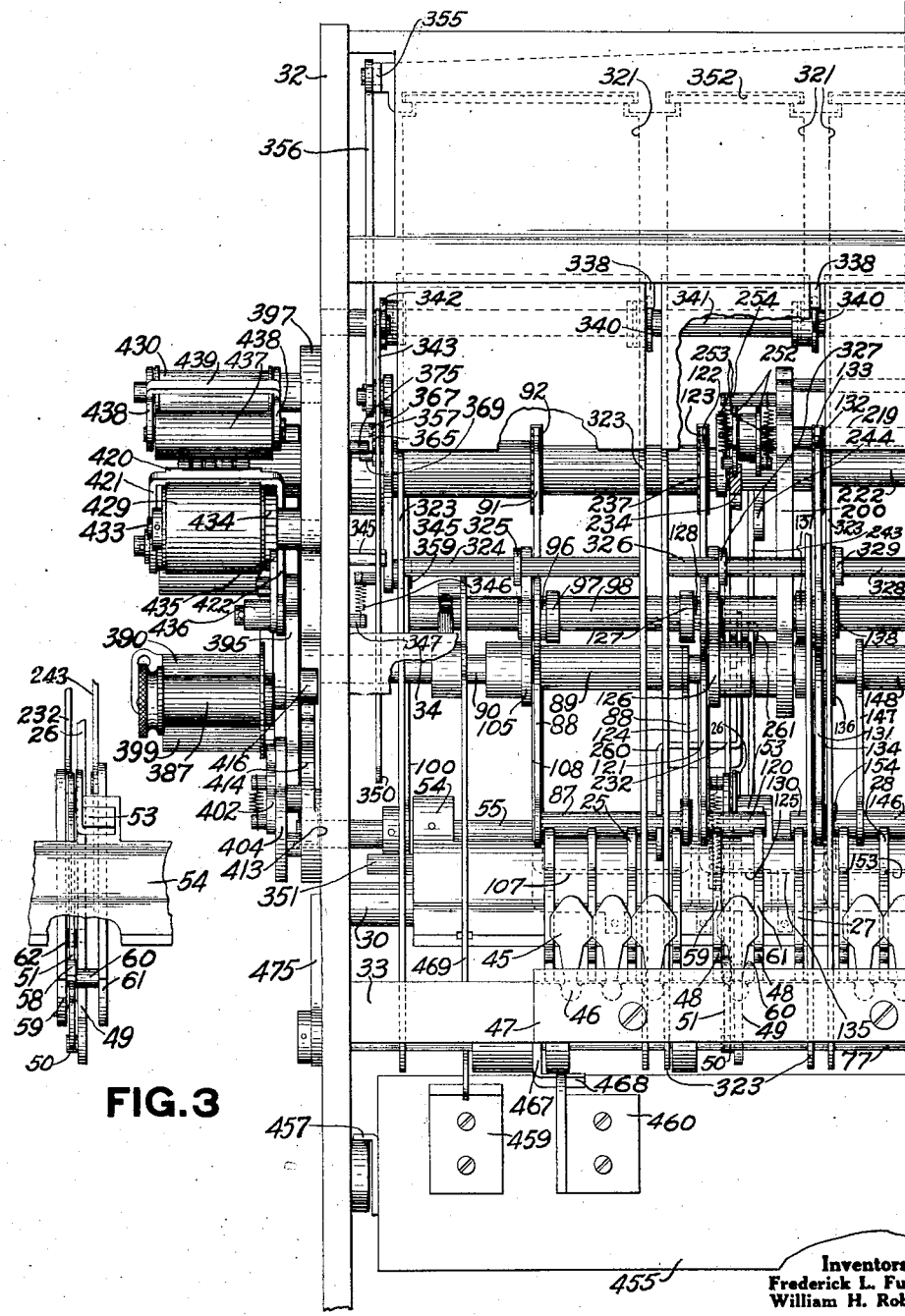
Fig. 3 is a fragmentary view in rear elevation showing the control of the clerk's initial key lever.

The means for preventing the depression of more than one key in any one group at one time comprises a plurality of arms 45 (Figs. 2ᴬ and 2ᴮ) pivoted at 46 between the bar 33 and a plate 47, secured to the said bar. These arms co-operate with extensions 48 on the levers 25, 27, 28 and 29. There are three arms 45 co-operating with the levers 25; eight arms 45 co-operating with the levers 28; and four arms 45 co-operating with the levers 29. The projections 48 on the rear of these levers extend, as viewed in Figs. 2ᴬ and 2ᴮ, between the arms 45 so that when a key in a certain group is depressed or rocked counter-clockwise (Figs. 6 and 11) the projection 48 thereon spreads the arm 45 on either side thereof apart, thereby moving all of the arms 45 associated with that group of keys and locking them so that it is impossible to depress another key in the same group.

Figure 19:
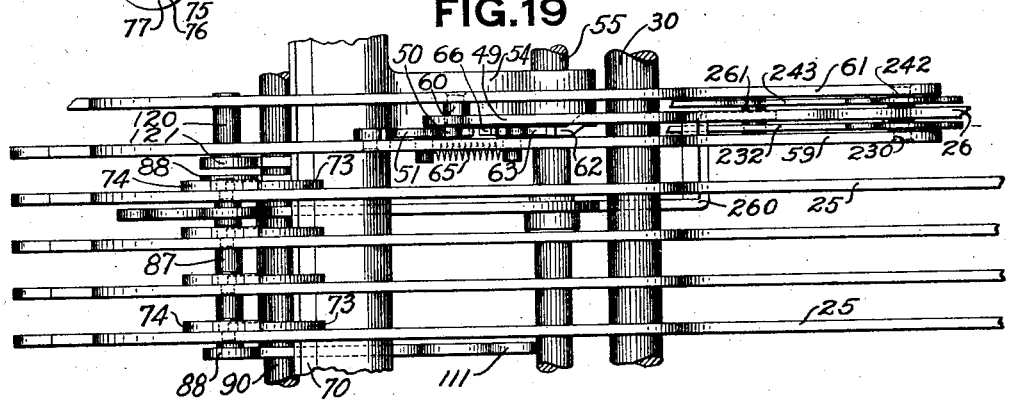
Fig. 19 is a fragmentary bottom view of the clerk's and transaction keys and shows their control of the totalizer engaging means.

The rear end of the clerk's lever 26 (Figs. 6, 19 and 22) is not like the rear end of the other levers and does not extend backward to the bar 33, but has integral therewith an arm 49 carrying a pin 50, which co-operates with an arm 51 pivoted at 52 to an L-shaped bracket 53 (Fig. 3), carried by a key coupler 54, fast on a shaft 55, carried by the side frames 31 and 32.

The arm 51 is provided with two projections 56 and 57. The projection 56 co-operates with a stud 58 carried by a lever 59, loose on the rod 30. The projection 57 co-operates with a stud 60 carried by a lever 61 loose on the rod 30. These levers 59 and 61 are for the purpose of selecting the clerk's initial indicator and rocking the proper clerk's totalizer into engagement with the actuators to be hereinafter described. These levers are provided with extensions 48 (Fig. 2ᴬ) and co-operating with a single arm 45, thereby preventing the operation of both levers during one operation of the machine. The lever 26 (Fig. 1ᴮ), which extends forward, carries the inscription "B", which designates clerk "B". When this lever is operated or rocked clockwise (Fig. 22) around the rod 30, its integral arm 49, through the pin 50, rocks the arm 51 clockwise, thereby moving the projection 56 underneath the stud 58 carried by the lever 59. With the projection 56 in this position, when the arm 51 is raised by means to be hereinafter described, "B's" totalizer is rocked into engagement with the actuators and "B's" indicator is selected and exposed to view.

However, when the arm 51 is caused to remain in the position shown in Figs. 6, 18 and 22, upward movement of the arm 51 through the pin 60 and the projection 57, rocks the lever 61 clockwise (Fig. 18), and thereby, through means to be hereinafter described, causes "A's" totalizer to be rocked into engagement with the actuators and also causes "A's" indicator to be selected and exposed to view.

When clerk "B" is operating the machine, there is means provided whereby when the "B" key 26 is depressed, it will remain depressed until an amount key has been operated, after which said "B" key returns to its normal position. This means is a portion 62 (Figs. 3, 6, 19 and 22) bent out from the side of the arm 49 so that it lies in the plane of a hook 63 integral with the lower end of a lever 64, loose on the shaft 55. The hook 63 is held in the position shown in Figs. 6 and 22 by a coil spring 65 stretched between the lever 64 and a pin carried by the arm 51. Incidentally, this spring 65 also serves to maintain the arm 51 in its normal position. When the lever 26 is depressed it rocks the arm 49 counter-clockwise (Fig. 6) and clockwise (Fig. 22) and positions the projection 56 underneath the pin 58, as previously described. The portion 62 is raised whereby the lever 64 is rocked clockwise under the influence of the spring 65, so that the hook 63 engages underneath the projection 62 and retains the arm 49 and the lever 26 in the moved position.

The key coupler 54 is rocked counter-clockwise (Figs. 6 and 21) as will be hereinafter described, and as it nears the end of this counter-clockwise movement a lug 66 thereon strikes the upper end of the lever 64 and rocks it counter-clockwise which disengages its hook 63 from the portion 62. A spring 67 then returns the lever 26 to normal position.

As before stated, the key coupler 54 co-operates with the key levers 25, 27, 28 and 29 and also with the two levers 59 and 61. As is well known in the art, the purpose of the key coupler is to permit the starting of an operation of two or more keys, for example, the $1 key and the 60¢ key, and then complete the operation by pressing either one of the keys. This is accomplished through a lip 70 engaging notches 71 in the keys 27 and 28 and 29. The lip 70 on the key coupler normally lies against the upper edge of the rear portion of the key levers 27, 28 and 29, and also the levers 59 and 61 and is held there by its own weight. Depression of a key 27, 28 or 29 causes said key to rock counter-clockwise (Figs. 6 and 11), whereby the lip 70 engages the notch 71 and the key coupler is rocked in a counter-clockwise direction (Figs. 6 and 11) and clockwise (Figs. 18 and 22). All of the keys which are not depressed are held in their normal position because the lip 70 on the key coupler in its upward movement passes just in front of a curved portion 69 on all of the keys which are not operated. When a key has been fully depressed and the operator releases it the weight of the kep coupler 54 rocks the operated key clockwise to normal position.

*Transaction keys.*

The transaction key levers 25 are what are commonly called in the art "flexible keys", that is, they are so constructed that they may be partially depressed and locked in this position without affecting the key coupler, after which, by depression of any of the amount keys they are carried down the full extent, whereby they will, through means to be hereinafter described, set up the proper printing wheels and proper indicators. These levers are cut away to the line 72 (Figs. 6, 18, 19 and 22) and have pivotally mounted on the side thereof two pawls 73 and 74. The pawl 73 is loose and hangs in the position as shown by its own weight. The pawl 74 is held in the position shown by a spring 79. The lower end rests against a lug 75 integral with the collar 76, fast on a rod 77, carried by the side frames 31 and 32. Upon depression of the "Paid out" key lever 25 the rear end of the lever is raised whereby the pawl 74 is rocked in a counter-clockwise direction (Fig. 6) and clockwise (Figs. 18 and 22) by the spring 79 so that the upper end of the pawl strikes the upper end of the pawl 73. This operation of the "Paid out" key raises the lever high enough so that the edge 78 is on top of the lug 75, thereby retaining the key in its partially depressed position. After this has taken place upon the depression of any of the amount keys the key coupler 54 raises the lever 25 still further and disengages the pawl 74 entirely from the lug 75, thereby allowing the spring 79 to rock the pawl 74 still further in the direction mentioned, whereby its upper end hooks over the point 80 of the pawl 73, thus locking the pawl in a position so that its edge 81 forms the bottom of a slot exactly like the slot 71 in the other keys, whereby upon the complete depression of any of the amount keys the "Paid out" key is carried up with it and its rear end caused to be raised the same extent as the amount key. When the operator releases the key, the key coupler 54, through its engagement with the edge 81 of the pawl 73 rocks the lever 25 to normal position. Just before said lever reaches its normal position, the lower end of the pawl 74 engages the lug 75, thereby rocking said pawl in a clockwise direction (Fig. 6) and counter-clockwise (Figs. 18 and 22), whereby its hook is released from the point 80 of the pawl 73 and the lever is returned to its normal position.

*Actuating mechanism.*

There are three groups of actuating devices in this machine for controlling the previously mentioned totalizers and amount indicators; one associated with the lever 27; one device associated with the group of levers 28; and another device associated with the group of levers 29. These actuating devices are controlled directly by the operation of the amount key levers 27, 28 and 29. There are also two other actuating devices, one associated with levers 25 and the other with lever 26, for setting the type wheels and selecting the indicators thereby printing and indicating the class of transaction and the clerk making such transaction respectively.

The actuating mechanism associated with the transaction key levers 25 will be described first. The rear end of each of these levers is provided with a slot 86, co-operating with a rod 87 (Figs. 2A, 6, 18, 19 and 22), carried by parallel arms 88, connected by a sleeve 89, loose on a rod 90, carried by the side frames 31 and 32.

Only one of the slots 86 is shown in Fig. 6; Figs. 18 and 22 show how these slots are staggered or arranged at different angles so that when the rear end of the lever is raised, each of the levers 25 will move the rod 87 a different distance towards the back of the machine. Integral with the left hand arm 88, as viewed in Fig. 2ᴬ, is a segment 91, meshing with the gear 92, which is for the purpose of imparting movement to the transaction printing mechanism to be hereinafter described.

Figure 2B:
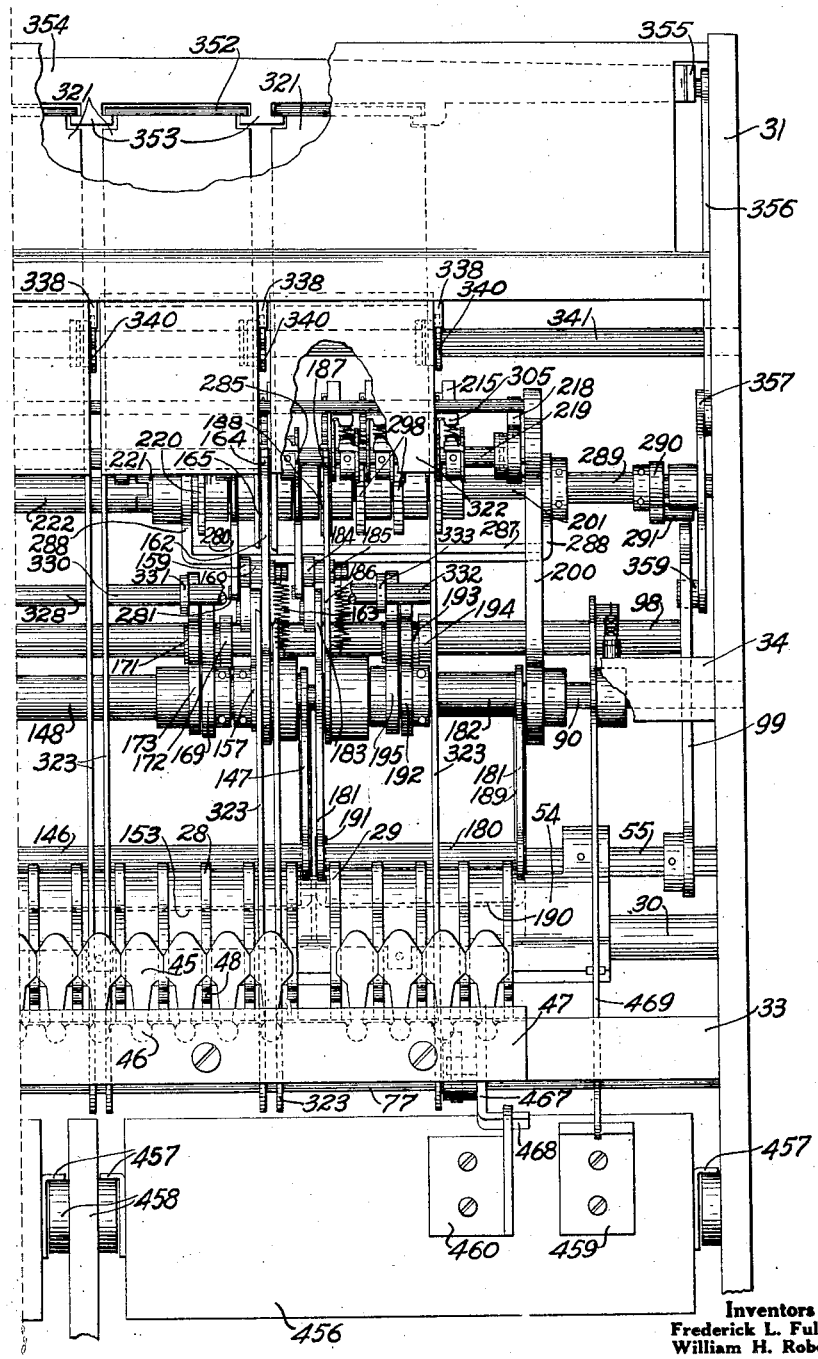

The arm 88, which has integral therewith the segment 91, is provided with an opening 95 (Fig. 5) into which projects a roller 96 (Figs. 2ᴬ and 6) carried by one end of a link 97, the other end of which is loose on a rod 98, carried by an arm 99 (Figs. 1ᴬ, 2ᴮ, 9 and 11) and an arm 100 (Figs. 1ᴮ, 2ᴬ and 6), both of which are fast on the shaft 55, to which is also fast the key coupler 54. Loose on the rod 90 is a plate 105 (Figs. 2ᴬ and 6) with an opening 106 exactly like the opening 95 in the arm 88, and into which projects the roller 96 (Figs. 2ᴬ and 6). This plate 105 and roller 96 are for the purpose of differentially positioning the indicator carrying mechanism as will be hereinafter described.

Co-operating with all of the levers 25 is a bail 107 (Figs. 2ᴬ and 6) integral with an arm 108 (Figs. 2ᴬ and 6), loose on the shaft 55. The arm 108 is provided with a projection 109 extending into a notch 110 in an arm 111, integral with the arm 88, which has the slot 95.

The bail 107 is held in contact with the upper edge of the levers 25 by a coil spring 112, stretched between said bail and a collar 113 on the shaft 30.

The operation of the just described device is as follows:—Depression of any one of the key levers 25 rocks said lever counter-clockwise (Fig. 6) thereby raising its rear end and simultaneously raising the bail 107, thus removing its portion 109 from the slot 110 in the arm 111. Just before the portion 109 goes out of the slot 110 the slot 86 in the operated lever engages the rod 87. Said slot is provided with a neutral portion at the top so that as the lever is moved still further the rod 87 is not moved out of position until after the portion 109 is entirely disengaged from the slot 110 in the arm 111. After this happens the angular portion of the slot 86 moves the rod 87 towards the rear of the machine, thereby rocking the arms 88 and consequently the segment 91 in a counter-clockwise direction, thereby rotating the gear 92 clockwise a distance corresponding to the angle of the slot 86 in the operated key.

When the key coupler 54 is rocked counter-clockwise (Fig. 6), (which rocking it will be remembered takes place after the depression of one of the amount keys 28 or 29, it being impossible to fully depress one of the levers 25 without depressing one of the amount keys), it rocks the shaft 55 and consequently the arms 99 and 100 in the same direction, thereby moving the link 97 towards the front of the machine. This forward movement of the link 97 takes place approximately at the same time that the arm 88 is being rocked in a counter-clockwise direction under the control of the slot 86.

Let it be assumed that before the operation just described that the parts were in the position illustrated in Figs. 5 and 6. As the arm 88 is rocked counter-clockwise and the link 97 is being moved toward the front of the machine, the roller 96 will follow the edge 93 of the opening 95 in the arm 88 until it comes to a neutral portion 114 or the portion 101 (Fig. 5) of said opening. Due to the fact that the position of the opening 95 is changed from that of the opening 106 in the arm 105, the roller 96 (because it projects into both openings 95 and 106) will follow the edge 102 of the opening 106 in the plate 105 and move the plate 105 counter-clockwise until the roller 96 comes to a neutral portion 115 or the portion 104 in said opening. When the roller is in the portion 101 (Fig. 5) and the portion 104 (Fig. 6) or the neutral portions 114 and 115 it has positioned the plate 105 commensurate with the angle of the slot 86 (Fig. 18) of the key which has been operated.

When the arm 100 is in its extreme moved position, a radius struck from the center of rod 98 and passing through the center of roller 96 would intersect a radius struck from the center of rod 90 and passing through the radius point of the portions 101 and 104 of the arm 88 and plate 105. These two intersecting points are the extreme upper and lower differential positions of the arm 88 and plate 105. To insure the proper setting of the plate 105 at all differential positions between said points the neutral portions 114 and 115 are provided. Said neutral portions are equal in length to the sum of the height of the two segments of the intersecting arcs.

The clockwise movement of the key coupler 54 (Fig. 6) to normal position rocks the shaft 55 and the arms 99 and 100 likewise thereby moving the link 97 towards the rear of the machine. In its rearward movement the roller 96 on the link 97 has no effect upon the plate 105, because, for reasons to be explained in connection with the indicating mechanism, this plate is allowed to remain in the position into which it has been set until a subsequent operation of the machine.

Just before the operated key reaches its home position the portion 109 of the arm 108 engages the slot 110 in the arm 111 and holds said arm, the arm 88, the segment 91 and the rod 87 in their normal position.

If an operation of the machine involving the "Paid out" key is made, the plate 105 (Fig. 6) is rocked counter-clockwise to its farthest position and caused to remain in this position by means to be hereinafter described until a subsequent operation of the machine.

Should the subsequent operation of the machine involve the operation of a "Cash" key, when the link 97 is moved towards the front of the machine its roller 96 follows the edge 93 of the opening 95 in the arm 88 until it reaches the neutral portion 114 of said opening. During this operation the roller 96 engages the edge 103 of the opening 106 in the plate 105 and rocks the plate in a clockwise direction until the roller is engaged in the neutral portion 115 of said opening 106. This positions the plate 105 from the "Paid out" position in which it was left in the previous operation to the "Cash" position in the subsequent operation.

The differential mechanism associated with the clerk's key 26 and the clerks' levers 59 and 61 is shown only in Fig. 2ᴬ, but as this mechanism is substantially the same as that described in connection with the transaction keys only a brief description of it will be given.

The levers 59 and 61 are provided with slots similar to the slots 86 in the keys 25 and co-operate with the stud 120 (Fig. 19) carried by an arm 121 loose on the rod 90.

Integral with the arm 121 is a segment 122 meshing with a gear 123, which is for the purpose of setting up the clerks' initial type wheels, as will be hereinafter described. Also integral with the arm 121 is another arm (not shown) like the arm 111, shown in Fig. 6. This arm is also provided with a slot like the slot 110 and has co-operating therewith an aligning arm 124 (Fig. 2ᴬ) having integral therewith a bail 125 (Fig. 18), extending across the top of the two levers 59 and 61 and held in this position by a spring like the spring 112. Also loose on the rod 90 and adjacent the arm 121, is a plate 126, identically like the plate 105 associated with the transaction keys.

Loose on the rod 98 is a link 127 carrying the roller 128, which extends through openings (not shown) in the arm 121 and plate 126. The openings are identically the same as the openings in the arms 88 and plate 105 respectively.

The operation of this differential mechanism is exactly the same as that used in connection with the transaction keys, only that instead of having four key levers controlling the movement of the arm 121, there are only two levers 59 and 61.

The "5" cent key lever 27 has associated therewith a differential mechanism which is identically the same as that just described in connection with the clerks' levers 59 and 61.

The lever 27 is provided with a slot 129 (Fig. 6) which co-operates with a stud 130 (Fig. 2ᴬ) carried by an arm 131 like the arm 88, loose on the rod 90. The arm 131 also has integral therewith a segment 132, meshing with a gear 133, which is for the purpose of setting up the "5" cent or "units" type wheel, to be hereinafter described.

This arm 131 also has co-operating therewith an aligning arm 134, loose on the shaft 55. Integral with the arm 134 is a bail 135, which extends over the top of the "5" cent lever 27, and is held in such position by a spring 139 (Fig. 18) like the spring 112, previously described. Also loose on the rod 90 and adjacent the arm 131 is a plate 136, like the plate 105. The arm 131 and plate 136 are provided with openings like the openings 95 and 106 respectively, in the arm 88 and plate 105.

Loose on the rod 98 is a link 137, carrying a roller 138, which extends through the openings in the arm 131 and plate 136, and is for the purpose of selecting the indicators, to be hereinafter described, asociated with the "5" cent key lever 27.

The operation of the differential mechanism associated with the "5" cent lever 27 is practically the same as that associated with the transaction key levers 25, therefore, this operation will not be repeated here.

The differential mechanism associated with levers 28 will now be described:—The levers 28 are each provided with a slot 145 (Fig. 11) set at different angles and co-operate with a rod 146 (Figs. 2ᴬ, 2ᴮ and 11) carried by parallel arms 147, secured to a sleeve 148, loose on the rod 90. Integral with the arm 147 (Fig. 2ᴮ) is an arm 149 (Fig. 11) having a slot 150 into which projects a portion 151 of an aligning arm 152 loose on the shaft 55. Integral with the arm 152 is a bail 153 which has integral therewith another arm 154 (Fig. 2ᴬ) loose on the shaft 55. The bail 153 extends across the top of all of the levers 28 and is held in contact therewith by a coil spring 155, having one end secured to a projection on the bail and the other end secured to a collar 156 on the rod 30.

Fast on the sleeve 148 is an arm 157 (Figs. 2ᴮ and 11) having pivotally mounted thereon at point 158 a bell crank 159. This bell crank co-operates with a transfer mechanism to be hereinafter described. The bell crank 159 carries an antifriction roller 160 projecting into a slot 161 formed in an arm 162, mounted loosely on the sleeve 148. The roller 160 is held in the bottom of the slot 161 by the coil spring 163, one end of which is secured to the stud upon which the roller 160 is mounted, the other end being secured to a pin carried by the arm 162. Integral with the arm 162 is a segment 164 (Figs. 1ᴬ, 2ᴮ and 11), meshing with a gear 165, which is for the purpose of actuating the "10's" totalizer wheel and also for setting up the type wheel, as will be hereinafter described.

Also secured to the sleeve 148 is a plate 169 (Figs. 2ᴮ, 10 and 11) provided with an opening 170, into which extends an anti-friction roller 171, carried by a link 172, the other end of which is pivoted on the rod 98. Loose on the sleeve 148 is a plate 173, provided with an opening 174 exactly like the opening 170. These openings are identical with the openings 95 and 106 previously described. This plate is for the purpose of selecting the indicator commensurate with the value of the key depressed, as will be hereinafter described.

The operation of the just described mechanism is as follows: Upon depression of, for instance, the "60" key lever 28, said lever is rocked counter-clockwise (Fig. 11), thereby raising the bail 153, and rocking the arm 152 counter-clockwise, and disengaging its portion 151 from the arm 149. Just before this disengagement, the slot 145 engages the rod 146 and rocks the arm 147, the sleeve 148 and the arm 157 in a counter-clockwise direction a distance depending upon the angle of the slot 145. The counter-clockwise movement of the arm 157 causes the arm 162, and consequently the segment 164, to be rocked counter-clockwise through the bell crank 159, roller 160 and slot 161, thereby rotating the gear 165 in a clockwise direction a distance commensurate with the value of the key depressed.

The counter-clockwise movement of the lever 28 also rocks the key coupler 54 and the shaft 55 counter-clockwise thereby rocking the arms 99 and 100 counter-clockwise, and causing the rod 98 to be moved towards the front of the machine, thereby moving the link 172 therewith. The plate 169, being fast to the sleeve 148, is consequently rocked counter-clockwise simultaneously with the movement of the arm 147 and arm 157. The forward movement of the link 172 takes place at the same time the plate 169 is being rocked counter-clockwise, and as the roller 171 projects through the slot 170, in the plate 169 and also the opening 174 in the plate 173, the latter is also rocked counter-clockwise about the shaft 90 a distance dependent upon the movement of plate 169. The variable movement of plate 173 is used to select the indicator by means to be described.

When the lever 28 has been fully depressed, the operator releases said lever, and through the weight of the key coupler 54 the lever is rocked in a clockwise direction to its normal position. This movement, through the slot 145, rocks the arm 147, sleeve 148, arm 157 and the plate 169 in a clockwise direction to their normal position. Through the bell crank 159, the arm 162 and segment 164 are rocked clockwise to their normal position. It might be stated here that in Fig. 11 the segment 164 and bell crank 159 are shown in a position in which a transfer has taken place, consequently the segment 164 is moved one step further towards the right than it would normally be. In the normal position the roller 160 is in the upper part of the slot 161.

The means for stopping the segment 164 in the normal position so that no transfer will take place will be hereinafter described in connection with the transfer and totalizing mechanism.

The clockwise movement of the key coupler 54 to normal position rocks the shaft 55 and the arms 99 and 100 in a clockwise direction, thereby moving the link 172 towards the rear of the machine, but in this rearward movement, the roller 171 has no effect upon the plate 173 because, for reasons to be hereinafter described, the plate 173 is not returned to its normal position, but allowed to remain in the position in which it has been set, until a subsequent operation of the machine, in order that the indication for this particular operation may be exposed to view. Just before the arm 147 reaches its normal position, the portion 151 on the arm 152, under the influence of the spring 155, is caused to engage the notch 150 and arm 149, thereby aligning the arm 149, the arms 147, rod 146, the arm 157 and the plate 169 in their normal position.

The differential mechanism associated with the "dollar" key levers is substantially the same as that described in connection with levers 28, therefore, but a brief description will be given here.

Each of the levers 29 is provided with a slot 179 (Fig. 11) which co-operates with a rod 180 (Fig. 2ᴮ) carried by parallel arms 181, fast on a sleeve 182, mounted on the rod 90. Integral with the left hand arm 181 is an arm 183 like the arm 157. This arm 183 carries a bell crank 184, carrying an anti-friction roller 185 projecting into a slot (not shown) in an arm 186, loosely mounted on the sleeve 182. The bell crank 184 and roller 185 are identically the same as the bell crank 159 and roller 160 associated with the levers 28.

Integral with the arm 186 is a segment 187, meshing with a gear 188. The arm 186 and segment 187 are identically the same as the arm 162 and segment 164 previously described. The gear 188 is for the purpose of actuating the "units of dollars" totalizer wheel and also for setting up the type wheel associated with that amount. Integral with the right hand arm 181 (Fig. 2ᴮ) is an arm identically the same as the arm 149 and carries a slot like the slot 150, with which co-operates an aligning arm 189 loose on the shaft 55. Integral with the arm 189 is a bail 190 extending across all of the levers 29. Also integral with the bail 190 is another arm 191, loose on the shaft 55 and is for the purpose of giving a bearing to this end of the bail so that it may be oscillated freely. The bail 190 is held in contact with the levers 29 by a spring (not shown) but like the spring 155. Also secured to the sleeve 182 is a plate 192, identical with the plate 169, having a slot of the same formation into which projects an anti-friction roller 193, carried by a link 194, identical with the link 172, the other end of the link 194 being pivoted to the rod 98.

Adjacent the plate 192 and loose on the sleeve 182 is a plate 195 identical with the plate 173 and having a slot of the same formation into which also projects the roller 193.

The operation of the above described devices is identically the same as that given in connection with the actuating mechanism associated with the key levers 28, therefore, it is not thought necessary to repeat the same description.

Full stroke device.

The machine is provided with a full-stroke device so that once an amount key has been started its operation must be completed. This mechanism comprises a pawl 196 (Figs. 1$^B$ and 6) loose on the rod 311; a spring 197 stretched between a pin 198 carried by the pawl and a stud 199 mounted on the side frame 31; and a series of notches 204 formed in the upper edge of the arm 100. Counter-clockwise movement of the arm 100 causes said arm to strike a point 210 on the pawl 196 and rock said pawl clockwise. This point then co-operates with the notches 204 whereby the pawl 196 is maintained in such a position that a clockwise movement of the arm 100 is prevented.

At the completion of the counter-clockwise movement of the arm 100 the pawl 196 is disengaged from the notches 204 and when the arm 100 is rocked clockwise to normal position, it engages a point 211 on the pawl 196 and rocks said pawl counter-clockwise whereby the point 211 co-operates with the notches 204 in such a way that counter-clockwise movement of the arm 100 is impossible.

From the above it can be seen that when the operator depresses the key he must complete the depression thereof and when he releases the key, after the complete depression, said key must return to its normal position before it or any other key can be operated.

Totalizers.

As before stated, the machine is provided with two totalizers, one for each of the two clerks, and for convenience in description, one of the totalizers will be called as "A's" totalizer and the other as "B's" totalizer.

The totalizers are supported by a frame work comprised of two parallel plates 200 (Figs. 1$^A$, 1$^B$, 6 and 11), having one end mounted on the rod 90 and the other end supported by a shaft 201 mounted in the side frames 31 and 32.

"A's" totalizer will be given a general number 202 and "B's" totalizer 203 (Figs. 4 and 11). "A's" totalizer 202 is provided with six totalizer wheels 205 (Figs. 1$^A$, 4, 11 and 20), the units and tens of cents and units of dollars wheels each having secured to the side thereof, a pinion 206. These wheels are loose on a rod 207, carried by parallel arms 208, fast on a shaft 209, mounted in the plates 200.

"B's" totalizer is provided with six totalizer wheels 215, the units and tens of cents and units of dollars wheels each having secured to the side thereof, a pinion 216 (Figs. 1$^A$, 4, 7, 9 and 11). These wheels are loose on a rod 217, carried by parallel arms 218, fast on a shaft 219, carried by the plates 200.

The pinions 206 and 216 are normally out of engagement with their actuating gears. The pinions 206 and 216, which are secured to the units wheels 205 and 215, are arranged to be engaged by means to be hereinafter described, with a gear 220, secured to a sleeve 221, connected by a mortice and tenon connection to a sleeve 222, the other end of which is secured to the previously described gear 133, which is positioned by the movement of the "5" cent key lever 27. These sleeves 221 and 222 are loose on a sleeve 223, which, in turn, is mounted on a sleeve 224, loose on the shaft 201. The purpose of the sleeves 223 and 224 will be hereinafter described.

The pinions 206 and 216, which are secured to the "10's" totalizer wheels 205 and 215, respectively, are arranged to engage with the previously described gear 165 (Figs. 1$^A$, 2$^B$ and 7). This gear 165 is secured at one end to the above mentioned sleeve 223, and from the previous description it will be remembered that this gear is positioned by the segment 164 (Fig. 11) controlled by the "10" to "90" key levers 28.

The pinions 206 and 216, which are fast to the "units of dollars" totalizer wheels 205 and 215, respectively, are arranged to be engaged with the previously described gear 188. This gear is fast on one end of the above mentioned sleeve 224, and is positioned by the segment 187 (Figs. 1$^A$ and 2$^B$) under the control of the "$1" to "$5" key levers 29.

Totalizer engaging mechanism.

As previously stated, the machine is arranged to be operated by two different clerks, clerk "A" and clerk "B." There are two levers 59 and 61 (Figs. 18, 19 and 22), the lever 59 being operated when clerk "B" operates the machine and the lever 61 being operated when clerk "A" operates the machine. As there is only one clerk's initial lever 26 extending out of the front of the machine, clerk "A's" lever 61 is automatically operated, as will be remembered, by the pin 60 and arm 51 when the key coupler 54 is raised by depression of one of the amount keys. When this lever 61 is operated, clerk "A's" totalizer 202 is rocked into engagement with its actuating gears. When clerk "B" operates the machine, he first depresses the lever 26, as previously described, thereby breaking the connection between the arm 51 and the pin 60 on "A's" lever 61 and effectively connects the arm 51 with the stud 58, carried by "B's" lever 59, so that when the arm 51 is raised by the upward movement of the key coupler 54, "B's" totalizer 203 is rocked into engagement with its actuating gears.

In the accomplishment of these results, "B's" lever 59 is provided with a pin 230 (Figs. 1ᴮ, 6 and 22), which projects into an opening 231 in a link 232, the upper end of which is pivoted to a lever 234 (Figs. 1ᴮ, 2ᴬ, 4, 6 and 22), loose on the sleeve 222. The lever 234 is provided with a cam slot 235, into which projects an anti-friction roller 236, carried by an arm 237, fast on the shaft 219.

It will be remembered that the arms 218 which carry the rod 217 supporting the totalizer wheels 215 are also fast on the shaft 219. From this and the above description it will be seen that as the lever 59 is rocked counter-clockwise (Fig. 6) or clockwise (Fig. 22) by the arm 51 and stud 58, and as said lever 59 nears the completion of its counter-clockwise movement (Fig. 6) or clockwise movement (Fig. 22) the pin 230 strikes a shoulder 238 in the opening 231. When this occurs and by the continued movement of the lever 59 to its full extent, the link 232 is moved forward in the direction of its length, thereby rocking the lever 234 counter-clockwise (Fig. 4) or clockwise (Fig. 22) and through the slot 235 and roller 236 rocks the arm 237, shaft 219 and arms 218 counter-clockwise (Fig. 4) or clockwise (Fig. 20), thereby engaging the pinions 216 with the gears 165, 188 and 220. This engagement occurs just before the amount levers 28 and 29 reach the end of their first oscillatory movement, which is counter-clockwise (Fig. 11). The slots 145 in these levers have at their lower ends a neutral portion whereby the rods 146 and 180 are held stationary. This neutral portion is for the purpose of maintaining the gears 165, 188 and 220 in the position to which they have been differentially set until after the totalizer pinions 215 have been engaged therewith, as just described.

With the totalizer pinions in engagement with the above mentioned gears, it can be readily seen that when the operator releases the amount levers 28 and 29, and they are rocked clockwise to their normal position by the key coupler 54, the amount according to the value of the key which has been depressed is accumulated upon the units and tens of cents and units of dollars totalizer wheels 215. This is caused, as will be remembered, by the segments 132, 164 and 187, in the manner previously described.

When clerk "A" is registering a sale on the machine, "A's" lever 61 (Fig. 6) is automatically rocked counter-clockwise (Fig. 6) or clockwise (Fig. 18) and clockwise (Fig. 6) or counter-clockwise (Fig. 18) to normal position, as previously described.

"A's" lever 61 carries a pin 242 (Figs. 1ᴮ, 18 and 19) which projects within an opening 241 like the opening 231, formed in a link 243 (Figs. 1ᴮ, 4, 18 and 19), the upper end of which is pivoted to a lever 244, loose on the sleeve 222.

The lever 244 is provided with a cam slot 245, into which projects an anti-friction roller 246, carried by an arm 247, fast on the shaft 209.

As previously described, the arms 208 which carry the rod 207, supporting the totalizer wheels 205, are also fast on the shaft 209. From this and the above description, it will be clear that when "A's" lever 61 is rocked counter-clockwise (Fig. 6) or clockwise (Fig. 18) and when the pin 242 therein strikes the shoulder 248 in the slot of the link 244 (said shoulder being identical with the shoulder 238 previously described), the link 244 is moved forward in the direction of its length, thereby rocking the lever 244 counter-clockwise (Fig. 4) or clockwise (Fig. 18) and through the slot 245 and roller 246 rocks the arm 247, shaft 209 and the arms 208 clockwise (Fig. 4) or counter-clockwise (Fig. 20), thereby engaging the pinions 206 with the gears 165, 188 and 220.

This engagement takes place at identically the same time during the operation of the machines as does "B's" totalizer pinions 216, above described, and when the operator releases the amount keys and they are returned to their normal position, the amount is accumulated in "A's" totalizer in identically the same manner and by identically the same means as that described in connection with "B's" totalizer; therefore, it is not thought necessary to describe this accumulating mechanism again.

*Totalizer aligning mechanism.*

The levers 234 and 244 are each provided with two notches 250 and 251. Normally engaging the notch 250 in each of the levers is a pawl 252. The pawls are held in engagement with the notches 250 by coil springs 253 (Figs. 2^A and 6) stretched between a pin carried by each of the pawls and a pin 254, carried by the plate 200.

When either of the levers 234 or 244 is rocked counter-clockwise (Fig. 4) or clockwise (Figs. 18 and 22) upon the movement of the links 232 and 243, respectively, the pawl is cammed out of the notch 250 and caused to engage the notch 251, thus holding the levers in alignment and consequently holding the totalizer pinions 206 in their actuating gears.

Figure 18:
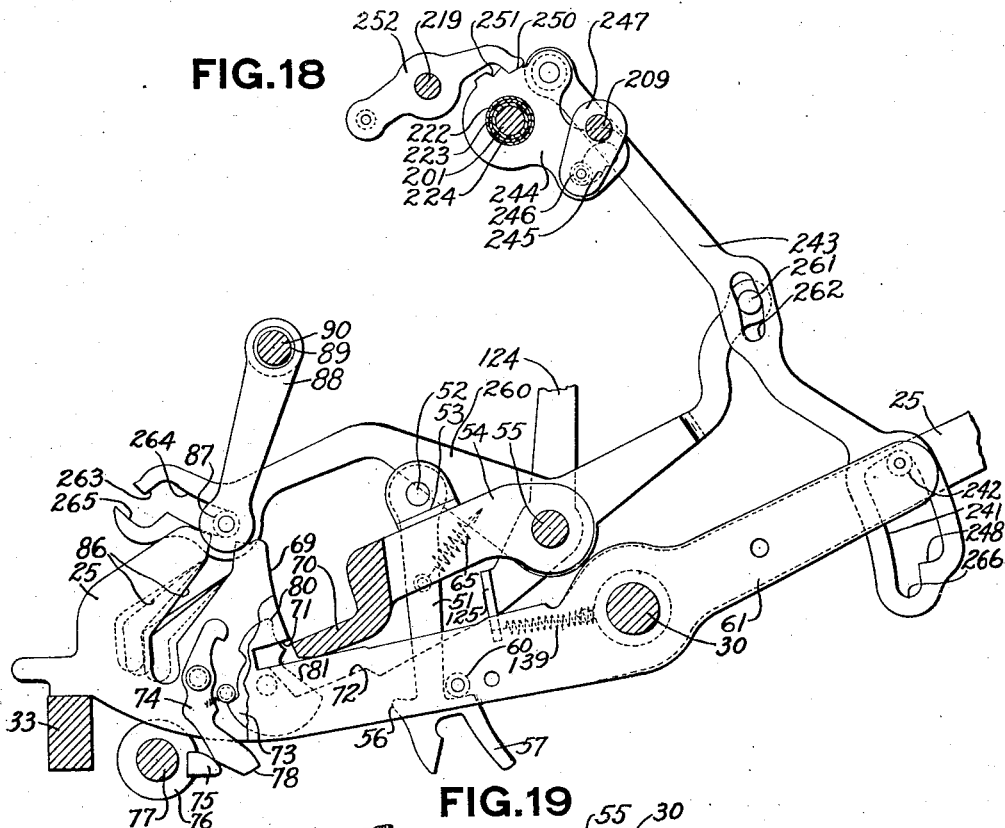
Fig. 18 shows the mechanism for rocking A's totalizer into mesh with the actuator and also shows the transaction keys and their control of said totalizer engaging means.

When in the position shown in Figs. 4, 18 and 22 with the pawl in the notch 250, said pawl serves to retain the totalizer pinions 206 and 216 out of engagement with the actuating gears. When the totalizers are out of engagement with the actuating gears, the pinions 206 and 216 are held in alignment by spring pressed pawls 255 (Fig. 11) which engage said pinions. When the totalizers are rocked into engagement the pawls 255 contact with rods 256, carried by the plates 200, thus allowing the pinions 206 and 216 to be rotated. By referring to Fig. 11, it will be noticed that there is a clearance between the rods 256 and the pawls 255, which is to allow the pinions to become engaged with the actuating gears before the aligning pawls are entirely out of engagement with the pinions, thus insuring that no movement of the totalizer wheels takes place at the time they are being engaged. Before the totalizer wheels are finally disengaged from the actuating gears, the aligning pawls 255 are in such position that no possible rotation of the totalizer wheels 205 and 215 can take place, thereby insuring a perfect alignment of the said totalizer wheels at all times.

*Disabling device for totalizer engaging mechanism.*

For certain operations of the machine which do not involve money being received, it is necessary to hold "A's" totalizer 202 and also "B's" totalizer 203 out of engagement with the actuating gears during the entire operation of the machine. In the present instances, these operations are "Charge" and "Paid out" operations.

To accomplish the above, a lever 260 (Figs. 1^B, 2^A, 6 and 18 and 22) is loosely mounted upon the shaft 55. The forward end of this lever carries a pin 261, which projects into a slot 262 in each of the links 232 and 243. The rear end of the lever 260 is provided with a slot 263 surrounding the rod 87 controlled by the transaction key levers 25.

As before stated, the slot 86 in these levers are cut at different angles (Figs. 18 and 22), the "Cash" key being first, "Charge" second, "Received on account" third, and "Paid out" fourth. The slot in the "Cash" lever has the lesser angle so that when this lever is depressed the rod 87 is moved one step to the right (Fig. 6) or left (Figs. 18 and 22). The slot 86 in the "Received-on-account" lever is cut at a slightly greater angle, thereby moving the rod 87 one step farther than the "Cash" key. By depression of either of these two keys, "Cash" or "Received-on-account", the rod 87 is always maintained in the upper portion 264 of the slot 263, consequently an operation of either of these two keys will have no effect upon the lever 260.

However, the slot 86 in the "Charge" key is cut at a greater angle than either the "Cash" or "Received-on-account" keys, consequently when this key is operated, the rod 87 is forced into a portion 265 of the slot 263, thereby rocking the lever 260 counter-clockwise (Fig. 6) or clockwise (Figs. 18 and 22). This movement of the lever 260 through the pin 261 and slot 262 in the links 232 and 243 rocks said links clockwise (Fig. 6) or counter-clockwise (Figs. 18 and 22) with their upper ends as the pivot point. The angle of slot 86 in the "Paid out" key is still greater than the angle of the slot 86 in the "Charge" key and when this key is operated the rod 87 is moved into the portion 265 and one step farther than it is moved by the "Charge" key. This also rocks the lever 260 clockwise (Figs. 18 and 22) which rocks the links 232 and 243 counter-clockwise with their upper ends as the pivot. The upper portion of the slot 262 in each of the links 232 and 243 is shaped so that when either of said links is moved downward to engage its respective totalizer, as previously described, said slot has no effect on the pin 261 or lever 260. When either the "Charge" or the "Paid out" key is depressed the pins 230 and 242 (Figs. 6, 18, 22 and 1^B) are in such a position that when either of the levers 59 or 61 is rocked said pins will not strike the shoulder 238 or 248, but will move into a portion 266 of the openings 231 and 241. This portion 266 is deep enough to allow the full counter-clockwise (Fig. 6) or clockwise (Figs. 18 and 22) movement of either of the levers 59 and 61, consequently the links 232 and 243 are not moved downward, thereby preventing any movement of the levers 234 or 244, consequently neither of the totalizers are rocked into engagement with the actuating gears. The reason for having the slots in all four of the transaction key levers cut at different angles will be hereinafter explained in connection with the printing and indicating mechanism.

*Transfer mechanism.*

The mechanism for transferring from the units wheel 205 to the tens wheel 205 and from the tens wheel 205 to the units of dollars wheel 205 of "A's" totalizer; and the means for transferring from the units wheel 215 to the tens wheel 215 and from the tens wheel 215 to the units of dollars wheel 215 of "B's" totalizer will now be described.

Secured to the side of the units and tens wheels 205 is a disk 270 (Figs. 1^A and 9) having a single tooth 271 thereon. Secured to the units and tens wheel 215 is a similar disk 272 (Figs. 1^A, 7, 8 and 9) having a similar tooth 273 thereon. The tooth 271 co-operates with a pair of teeth 274 and the tooth 273 co-operates with a pair of teeth 275. These teeth 274 and 275 are integral with a disk 276, loosely mounted on the sleeve 223. Integral with the disk 276 is an arm 280 (Figs. 9 and 11), which co-operates with a pin 281 on the bell crank 159. In Fig. 11 these arms are shown in the tripped position, that is, the position which they assume when a transfer has been made. Normally the surface 282 of the arm 280 is in engagement with the pin 281. This causes the bell crank to be in a position whereby the short arm carrying the pin 281 is in nearly a horizontal position and the long arm carrying the pin 160 is nearer to a vertical position and the segment 164 is one step towards the left, or in its normal zero position.

Let it be assumed that the arms 280 are in a position as just described and that the units wheel 215 passes from "9" to "0". When this occurs, the tooth 273 engages between the teeth 275 and rocks the disk 276 counter-clockwise from the position stated to the position shown in Figs. 9 and 11. When this occurs and the arm 157 is rocked clockwise to normal position, the bell crank 159 will move the segment 164 clockwise not only to its normal zero position but to one position past the zero position, thereby causing one to be added to the tens totalizer wheel 215.

When no transfer takes place and the arms 280 are in the position assumed above, they are in a nearly vertical position, and when the arm 157 is rocked clockwise to normal position, the pin 281 contacts with the surface 282 of the arm 280, and as the arm 157 continues in its clockwise movement, the engagement of the pin 281 with the surface 282 causes the bell crank 159 to be rocked counter-clockwise, thereby causing the roller 160 to be moved to the upper portion of the slot 161, thus maintaining the segment 164 in the normal or zero position and not allowing it to receive the one step extra movement to the position in which it is shown in Fig. 11. The transferring from the tens totalizer wheel 215 to the units of dollars totalizer wheel 215 is exacly the same as transferring from the units to the tens totalizer wheel, therefore no description will be given. As the transferring takes place near the end of the operation of the machine, there is provided means whereby the transfers take place successively.

The transfer from the units to the tens wheel takes place first, and then the transfer from the ten to the hundreds wheel takes place, and so on. This is accomplished by having the slots 129, 145, 179 end at different times. In other words, the slot 129 in the "5" cent key (Fig. 6) has a straight portion of approximately 1/4 inch at the top; the slot 145 (Fig. 11) has a straight portion of approximately 3/16 of an inch and the slot 179 in the dollars key has no straight portion at all. From this, it can be readily seen that the "5" cent or units segment is returned to its normal position before the tens segment reaches its normal position; and that the tens segment is returned to its normal position before the dollars segment reaches its normal position. This gives the transfer mechanism time to operate in succession, so that the transfer from the units to the tens segment reaches a position to effect a transfer before the tens segment, and the tens segment reaches its home position to effect a transfer before the units of dollars assume an effective transfer position.

The disk 276 is also provided with two aligning notches 283 and 284 (Fig. 9) which are engaged by a spring pressed pawl 285. With the parts in the tripped position the pawl engages the notch 284 but when the parts are in the normal position, as assumed in the previous description, said pawl engages the notch 283 and maintains the disk 276 and the teeth 274 and 275 in proper position to receive the transferring movement.

Means is provided for restoring the transfer disk 276 to its normal position. Integral with the disk 276 is an arm 286 (Figs. 7, 9 and 11) engaged by a bail 287, integral with parallel arms 288. The right hand arm 288 (Fig. 2^B) is fast on one end of a sleeve 289, to the other end of which is secured an arm 290, carrying a pin 291, which co-operates with a projection 292 (Fig. 9), integral with the arm 99.

When the transfer disk 276 and arm 286 are in the tripped position, as shown in Figs. 9 and 11, near the end of the downward stroke of the key, or near the end of the counter-clockwise oscillation of the arm 99, the arm 290, sleeve 289, arm 288 and consequently the bail 287 are rocked clockwise thereby rocking the arm 286 and the disk 276 clockwise to normal position, whereby the pawl 285 is caused to be disengaged from the notch 284 and to engage the notch 283.

The transfer from the units of dollars to the tens of dollars; from the tens of dollars to the hundreds of dollars and from the hundreds of dollars to the thousands of dollars totalizer wheels 205 and 215 is accomplished in the following manner. The units, tens and hundreds of dollars totalizer wheels 205 and 215 each have on the side thereof a disk 295, provided with a tooth 296 (Figs.

7 and 8). The tens, hundreds and thousands totalizer wheels 205 and 215 each have secured to the side thereof a pinion 297. Co-operating with the disk 295 and pinions 297 are three disks 298, provided with two pairs of teeth 299 and 300. The teeth 299 co-operate with the totalizer wheels 205 and the teeth 300 co-operate with the totalizer wheels 215. These disks are wide enough to be in the plane of the disks 295 and also in the plane of the pinions 297, consequently when the units of dollars wheel passes from "9" to "0," this tooth 296 engages the teeth 299 or 300 as the case may be, and rocks the disk 298 counter-clockwise, which movement is transmitted to the pinions 297, thereby causing the tens of dollars wheel to be advanced one step. These disks 298 are each provided with a projecting arm 301 (Figs. 7 and 8), which co-operates with the previously described bail 287, so that when said bail is operated it restores these higher order transfer disks to normal position.

The disks 298 are each provided with two V-shaped notches 302 and 303 (Fig. 8). Co-operating with these notches is a spring pressed pawl 304 which is like and operates the same as the pawl 285, previously described. Co-operating with the pinions 297 are spring pressed pawls 305 which are like and operate the same as the previously described pawls 255.

*Special transaction counters.*

For each of the previously described transaction keys there is provided a step by step counter which counts "1" each time any of these keys are operated.

These four counters are identically alike, and for convenience, the one associated with the "Paid out" lever 25 will be described.

This counter is provided with three wheels 310 (Figs 1ᴮ and 6), loose on a rod 311, mounted in the side frames 31 and 32. Each of the wheels 310 has secured to the side thereof a ratchet 312. Co-operating with the three ratchets 312 is a differentially timed pawl 313, pivotally mounted on a stud 314, carried by parallel arms 315, loose on the rod 311. The arms 315 are made integral by a yoke 316. Integral with one of the arms 315 is an arm 317, having connected thereto, the upper end of a link 318, the lower end of which (Fig. 6) is pivoted to the "Paid out" key lever 25.

From the above description, it will be clear that when the "Paid out" lever is depressed or rocked counter-clockwise through the link 318, the arms 317 and 315 are rocked in a clockwise direction, whereby the pawl 313 is raised a distance sufficient to rotate the units wheel 310 one step. As these step by step counters are very old and well known in the art, and illustrated in the U. S. Letters Patent No. 589,114 granted to F. H. Bickford, it is not thought necessary to give a further description of them here.

The transferring from the units to the tens being by means of a deep notch in the ratchet, whereby the units tine drops into said notch, the middle tine engages the ratchet associated with the tens wheel and advances said wheel one step. As before stated, there is one of these counters for each of the transaction levers 25, but as they are identically the same as the one just described, their description will not be repeated.

*Indicating mechanism.*

As previously stated, the machine is provided with indicating mechanism, the indicating tablets of which are arranged to be differentially selected under the control keys depressed, and then exposed to view.

These indicators are arranged in five groups; one group associated with the transaction key levers 25; one group associated with the clerk's initial lever 26 and its two associated levers 59 and 61; another group associated with the "5" cent lever 27; another group associated with the "10" to "90" cent levers 28, and another group associated with the "$1" to "$5" keys 29.

Each group of indicators 321 is carried in a box 322 supported by parallel arms 323 pivotally mounted upon the rod 77. Connecting the arms 323 associated with the transaction indicators, is a rod 324 (Figs. 2ᴬ and 6) to which is pivotally mounted one end of a link 325, the other end of which is pivoted to the previously described plate 105. Connecting the arms 323, associated with the clerks' indicators 321 is a rod 326 (Fig. 2ᴬ) having pivoted thereto one end of a link 327, the other end of which is pivoted to the previously described plate 126. Connecting the arms 323 associated with the units amount indicators 321 is a rod 328 (Figs. 2ᴬ and 2ᴮ), having pivoted thereto one end of a link 329, the other end of which is pivoted to the previously described plate 136. Connecting the arms 323, associated with the tens indicators 321 is a rod 330 (Figs. 2ᴮ and 11), having pivoted thereto one end of a link 331, the other end of which is pivoted to the previously described plate 173. Connecting the arms 323, associated with the dollars indicators 321 is a rod 332 (Fig. 2ᴮ) having pivoted thereto one end of a link 333, the other end of which is pivoted to the previously described plate 195.

Secured to the side of each of the indicator boxes 322 is an aligning plate 338 (Figs. 2ᴬ, 2ᴮ, 6 and 11) provided with V-shaped notches 339, which co-operate with an aligner 340 fast on a shaft 341 carried by the side frames 31 and 32. Also fast on the shaft 341 is an arm 342 (Figs. 2ᴬ and 6) having pivoted thereto, the upper end of a link 343.

This link is provided with a shoulder 344, normally resting upon a stud 345, carried by the side frame 32, and is held in such position by a coil spring 346, stretched between a pin carried by the link 343 and a pin 347, mounted in the frame 32. The extreme lower end 350 of the link 343 co-operates with a pin 351, carried by the key coupler 54 in a manner to be hereinafter described.

Each of the indicators 321 is provided with a circular portion 352 (Figs. 2^A, 2^B, 6 and 11), which co-operates with T-shaped portions 353 of a bar 354, extending across the top of the machine. Each end of the bar is provided with a formed portion 355 (Figs. 1^A and 1^B) to which is pivotally mounted the upper end of a link 356 (Figs. 1^A, 1^B, 2^A, 2^B, 6 and 11). The lower end of each of the links 356 is pivoted to an arm 357, pivotally mounted upon the shaft 201. Integral with each of the arms 357 is an arm 358 (Figs. 6 and 11), carrying anti-friction rollers 359, projecting within slots 360 formed in the arms 99 and 100.

The arm 357 (Figs. 2^A and 6) has pivoted thereto, a pawl 365. A portion 366 (Fig. 6) of said pawl is held in engagement with a pin 367, carried by the arm 357, by a coil spring 368, stretched between a pin 369 carried by the pawl 365 and a pin 370 carried by the arm 357.

From the above description it can be seen that when any of the amount keys are depressed by reason of the counter-clockwise movement of the arms 99 and 100 and through the slots 360 and rollers 359, the arms 358 and 357 (Fig. 6) are rocked clockwise thereby moving the links 356 downward and causing the previously exposed indicators 321 to be lowered to their normal position. As the arm 357 nears the completion of its clockwise movement a portion 371 of the pawl 365 strikes an edge 372 on the link 343, and rocks the link 343 counter-clockwise, with its upper end as the pivotal point, thereby disengaging the shoulder 344 from the stud 345. The engagement of the portion 371 of the pawl 365 with the edge 372 also causes said pawl to be rocked counter-clockwise whereby a shoulder 373 on said pawl engages the pin 367. This moves the spring 368 above the pivotal point of the pawl and thereby maintains said pawl in its moved position. The function of the pawl 365 is to unlock the indicator aligner by striking the portion 372 (Fig. 6). As the pawl does this it is turned on its pivot so that the portion 371 thereof is moved upward and forward so that the link can be moved upward to normal position to move the indicator aligner 340 before the arms 357 are rocked to normal to raise the selected indicator.

After the shoulder 344 has been disengaged from the stud 345, the link 343 with the help of the spring 346 is moved downwardly and rocks the arm 342, shaft 341 and all the indicator aligners 340 thereon in a clockwise direction. This causes said aligners 340 to be disengaged from the notches 339 in the plate 338. This part of the operation takes place during the first part of the downward stroke of the operated key.

After the previously exposed indicator 321 has been dropped to its normal position, and after the aligners 340 have been disengaged from the plates 338, the plates 105, 126, 136, 173 and 195 are differentially positioned under the control of the operated key in that respective group, as previously described. For example, as the plate 173 (Fig. 11) is being differentially positioned under the control of the "10" to "90" cent levers 28 it moves the link 331 toward the front of the machine, whereby the arms 323, associated with the tens indicators are rocked counter-clockwise from one to nine steps according to which key in this group is being operated. This movement of the arms 323 takes place near the end of the downward stroke of the operated key.

From previous description, it will be remembered that upon the downward stroke of the key the key coupler 54 is rocked counter-clockwise. Near the end of the counter-clockwise movement of the key coupler 54, the pin 351, carried thereby, engages in the edge 350 of the link 343, and moves said link upward until its shoulder 344 engages the stud 345, thereby positively aligning the indicator boxes which have just been differentially set under the control of their respective actuating plates 105, 126, 136, 173 and 195 which are moved different distances as determined by the angle of the slots in the rear of the keys 25, levers 59 and 61, and keys 27, 28 and 29.

When the operator releases the depressed key, the key coupler 54 returns all of the operated keys to their normal position and the shaft 55, as previously described, is rocked clockwise to its normal position, whereby, through the slots 360 and rollers 359, the arms 357 are rocked counter-clockwise to their normal position.

This movement of the arms 357 raises the links 356, thereby raising the bar 354 to its normal position. The upward movement of the bar through the T-shaped portions 353 (Figs. 2^A and 2^B) raises the indicators 321, which have been moved into alignment with said bar, as described above. As the arm 357 (Fig. 6) nears its normal position the pin 369 carried by the pawl 365, engages a pin 375 (Figs. 2^A and 6) and rocks the pawl 365 clockwise to its normal position, thereby moving the spring 368 below the pivotal point of said pawl, which is the normal position.

The bar 356 is guided in its reciprocation by plates 376 and 377 (Figs. 1A, 1B, 11 and 16). The plate 376 is provided with openings 378 thereby exposing the indicia on the indicators 321 to view.

*Printing mechanism.*

As previously stated, the machine is arranged to print on a record strip the amount of each transaction, the clerk making such transaction and the character of that transaction. In the accomplishment of this result there are provided three amount type wheels 380 (Fig. 1B); one clerk's type wheel 381, and one transaction type wheel 382. The right hand, or dollars type wheel 380 (Fig. 1B) is secured to one end of the sleeve 224, to the other end of which is secured the gear 188, which, as previously described, is differentially positioned under the control of the "$1" to "$5" key levers 29. The second type wheel 380, counting from the right, (Fig. 1B) or the tens of cents type wheel is secured to one end of the sleeve 223, to the other end of which is secured the gear 165, which is differentially positioned under the control of the "10" to "90" cent key levers 28. The left hand type wheel 380 (Fig. 1B) is secured to one end of the sleeve 222, to which is also secured the gear 133, which is differentially positioned under the control of the "5" cent key lever 27. The clerk's type wheel 381 is secured to one end of a sleeve 383, which has secured to the other end the gear 123, which is differentially positioned under the control of the clerk's levers 59 and 61, which, in turn, are controlled by the "B" key 26. The transaction type wheel 382 is secured to one end of a sleeve 384, the other end of which is secured to the gear 92, which is differentially positioned under the control of the transaction key levers 25.

From the above description, it will be clear that the amount type wheels 380 are differentially positioned under the control of the key levers 27, 28 and 29, and that the clerk's type wheel 381 is positioned to print the clerk's initial "B" if the lever 26 is operated, and "A" if said lever is not operated. The transaction type wheel 382 is set differentially under the control of the special transaction key levers 25.

*Detail strip.*

The detail strip is taken from a supply roll 387 (Figs. 1B and 14) over a roller 388, around a resilient platen 389 and wound upon a receiving roll 390. The supply roll 387 and the roller 388 are both carried by an arm 391. The receiving roller 390 is carried by an arm 392. The arm 392 is pivotally mounted on a hub 394 (Fig. 13) of a lever 395 which is pivoted on a stud 396 on a plate 397 secured to the frame 32.

The arm 391 is mounted on a hub 398, carried by the arm 392.

Also mounted on the stud 396 is a roller 399. Both the supply roll 387 and the receiving roll 390 are always held in contact with the roller 399 by a coil spring 400 stretched between the arms 391 and 392.

Secured to the roller 399 is a ratchet 401, engaged by a spring pressed pawl 402, pivoted at 403 to an arm 404. The arm 404 is rocked first counter-clockwise and then clockwise to its normal position, (Fig. 14) by means hereinafter described. The counter-clockwise movement thereof causes the pawl 402 to be entirely disengaged from the ratchet 401. However, said pawl is provided with portions 405, co-operating with a pin 406, carried by the arm 404, so that as the pawl is disengaged from the ratchet 401, it will not be thrown out of operative relation by its tension spring, but is rocked clockwise until the right hand projection 405 engages the pin 406. This positions the pawl so that during the clockwise movement of the arm 404 to normal position, the pawl 402 engages the next lower tooth and rotates said ratchet clockwise, thereby rotating the roller 399 clockwise, and causes the paper to be unwound from the supply roll 387 and wound upon the receiving roll 390.

The platen 389 (Fig. 13) is concentrically mounted upon a hub 410 which in turn is eccentrically mounted on a stud 411, carried by the lever 395 and its hub 394. On the end of the stud 411 is a lock nut 412, which is for the purpose of locking the platen 389, after it has been set to get the desired impression from the type wheels 380, 381 and 382.

The means for moving the platen 389 into engagement with the type wheels to take an impression therefrom comprises an anti-friction roller 413 (Fig. 14) and an arm 414 fast on shaft 55 and also secured to the arm 404 by two studs 417. The arm 414 is provided with a raised portion 415, so that as said arm is rocked counter-clockwise by the movement of the shaft 55 said portion 415 engages the roller 413 and rocks the lever 395 clockwise to move the platen 389 against the type wheels 380, 381 and 382. The lever 395 carries a roller 416 which co-operates with the arm 414. The clockwise movement of the shaft 55 to normal position, through the engagement of an edge 418 of the arm 414 with the roller 416 rocks the lever 395 counter-clockwise to normal position and moves the platen away from the type wheels 380, 381 and 382. These movements of arm 414, by the pins 417, rock the arm 404 to feed the detail strip as previously described.

After the type wheels have been differentially positioned and during the time that an impression is being taken therefrom, they are held in alignment by a bail 420, integral with an arm 421 and a lever 422, pivoted on a stud 423, carried by the plate 397. The lever 422 is provided with a slot 424 into which projects a roller 425 carried by an arm 426, integral with the lever 395.

From this it can be seen that when the lever 395 is rocked clockwise the lever 422 is rocked counter-clockwise through the roller 425 and slot 424, thereby causing the bail 420 to be engaged with aligning teeth 427 integral with each of the type wheels 380, 381 and 382. The counter-clockwise movement of the lever 395 to normal position disengages the bail 420 from the notches 427 and restores it to normal position. The means for inking the type wheels is an endless ribbon 428, supported by an inking roll 429, roller 431 and a roller 432. These rollers are mounted on studs 433, carried by the plate 397. Secured to the side of the roll 429 is a ratchet 434, which has co-operating therewith a spring pressed pawl 435, pivotally mounted at 436 on the lever 422.

When the lever 422 is rocked counter-clockwise to engage the bail 420 in the notches 427, the pawl 435 is raised thereby rotating the ratchet 434 and the roller 429 counter-clockwise. This causes the ribbon to be advanced so that an impression will be taken from different places on the ribbon for each transaction of the machine.

There is also provided a tension roller 437, carried by parallel arms 438 loosely mounted upon one of the studs 433. The arms 438 are made integral by a yoke 439 so that both arms move in unison. Due to the peculiar location and the weight of the roller 437, said roller always causes a tension to be put upon the ribbon 428.

Clerks' locks.

The machine is provided with two locks, which co-operate with the clerks' levers 59 and 61, the purpose of the locks being that when clerk "A" leaves the store, he operates his lock thereby rocking "B's" key lever 26 and holding it in the depressed position, so that only "B's" totalizer is rocked into engagement with the actuators. Furthermore, this makes it unnecessary for clerk "B" to depress his initial key each time he operates the machine when he is in the store alone. Should clerk "B" leave the store he operates his lock and thereby prevents clerk "A" from depressing the "B" key lever 26, so that when "A" operates the machine, only "A's" totalizer is thrown into engagement with the actuators.

"A's" lock 443 and "B's" lock 444 (Fig. 17) are mounted in the front cross bar 38. Co-operating with a bolt 445 on "A's" lock is a pin 446 carried by a bell crank 447 mounted on a stud 448 carried by the cross bar 38. A portion 449 of the bell crank 447 (when both locks are unlocked) rests upon the top of a portion 450 (Figs. 6, 17 and 22) of an arm 451 integral with the lever 26.

When clerk "A" operates his lock 443 and moves the bolt 445 to the right it, through the pin 446, rocks the bell crank 447 counter-clockwise, thereby causing the portion 449 to move the portion 450 of the arm 451 downward. This arm 451 being integral with the lever 26 and also the arm 49, causes said lever and said arm to be rocked counter-clockwise (Fig. 6) and clockwise (Fig. 22) thereby through the pin 50 moving the arm 51 counter-clockwise (Fig. 6) and clockwise (Fig. 22), and causing the projection 56 on said arm to be moved up underneath the pin 58 carried by "B's" lever 59. This causes the portion 57 to be moved out of operative relation with the pin 60, which is on "A's" lever 61, as previously described.

From this it can be seen that when "A" operates his lock, he renders his own lever 61 ineffective and causes "B's" key to be depressed so that only "B's" totalizer is rocked into engagement with the actuating mechanism.

When clerk "A" returns and unlocks his lock, thereby moving the bolt 445 inward to the position shown in Fig. 17, the spring 65 (Fig. 6) rocks the arm 51 clockwise or counter-clockwise (Fig. 22), and disengages the portion 56 from the pin 58, and causes the portion 57 to be moved into operative engagement with the pin 60 which controls the rocking into engagement of "A's" totalizer.

Should clerk "B" wish to lock his totalizer, he operates his lock 444 and moves the bolt 452 (Fig. 17) thereof to the right. This bolt is in such position that when moved to the right, it is directly below the portion 450 of the arm 451. Therefore it is impossible to rock said arm 451 or the arm 49, or the lever 26, all three of which are integral. Hence when the machine is operated, only clerk "A's" totalizer is rocked into engagement with the actuating mechanism.

Drawer release mechanism.

As the machine is adapted to be operated by two clerks and is provided with two clerks' totalizers, it is also provided with two cash drawers 455 and 456 (Figs. 2^A and 2^B). These drawers have on their sides L-shaped brackets 457, which co-operate with the usual rollers 458. "A's" drawer 455 has secured thereto, an angle plate 459 and an angle plate 460. Secured to the side of "A's" lever 61 (Fig. 6) is a pin 461, which co-operates with an arm 462 (Figs. 6 and 12) fast on a sleeve 463 mounted on a shaft 464 carried by the side frames 31 and 32. Also secured to the sleeve 463 is an arm 465 which co-operates with a pin 466, carried by a lever 467, loose on the shaft 77. The lever 467 has a formed portion 468 which co-operates with the angle plate 460. Co-operating with the angle plate 459 is the lower end of a lever 469 loose on the shaft 90. The lever 469 is held in engagement with the plate 459 by a coil spring 470 stretched between the upper end of the lever 469 and a pin mounted in the back cross bar 34.

The sleeve 463 is provided with an elongated slot 471, through which projects a pin 472, carried by the shaft 464. The purpose of this pin and slot connection will be hereinafter described. The operation of the above drawer release mechanism is as follows:

Counter-clockwise movement of the clerk "A" lever 61 causes the pin 461 to engage the arm 462 and rock the arm clockwise, thus rocking the sleeve 463 and the arm 465 clockwise, whereby the said arm, through its engagement with the pin 466 rocks the lever 467 counter-clockwise, thereby releasing the portion 468 from the angle plate 460. When this occurs, a drawer spring 473 forces the drawer open. The rocking of "A's" lever 61 by the depression of any of the amount keys rocks the key coupler 54 counter-clockwise, as previously described. This causes the lip 70 of said key coupler to move in front of the lever 469 thereby retaining the lever in the position shown in Fig. 6. However, after the depressed key is released and the key coupler 54 returns to its normal position, the spring 470 rocks the lever 469 clockwise, and a shoulder 474 on the lever 469 moves above the lip 70 on the key coupler 54, and prevents another operation of the machine until after the drawer has been pushed in and locked by the lever 467.

When "B" operates his lever 59, "B's" drawer 456 is opened in identically the same manner as "A's" drawer, just described. Therefore, it is not thought necessary to described the opening of this drawer.

*Manual drawer release.*

It may sometimes be necessary to open the drawers without an operation of the machine. In order to accomplish this, there is secured to the shaft 464 a lever 475 (Figs. 2^A, 12 and 14). When it is desired to open the drawers, the operator moves the lever 475 in a clockwise direction, as viewed in Fig. 14, and thereby, through the pin 472 and slot 471 causes the sleeve 463, and consequently the arm 465, to rock clockwise whereby said arm operates the pin 466 and rocks the lever 467 counter-clockwise (Fig. 6) just the same as though the "A" or "B" lever 61 or 59, respectively, had been operated.

If it is desired to operate the machine while the drawer is open, the operator then moves the lever 475 counter-clockwise from the position shown in Fig. 14 whereby an arm 476 (Figs. 6 and 12), which is fast on the shaft 464 is rocked counter-clockwise. This arm is in the same plane as the lever 469 and is of such a length that when rocked counter-clockwise it touches said lever 469 and prevents the spring 470 from rocking the lever clockwise, after a depressed key has been returned to its normal position, thereby preventing the shoulder 474 from hooking over the lip 70 on the key coupler. This movement of the shaft 464 and arm 476 does not move the arms 462 and 465 because the pin 472 moves idly in the slot 471.

*Bell mechanism.*

Co-operating with the clerk's levers 59 and 61, are two different sounding bells which ring when the machine is operated. These bells 480 and 481 are mounted upon a rod 482, carried by the side frames 31 and 32.

Co-operating with each bell is a bell hammer 483 loosely mounted on the rod 30. Pivoted to each of the levers 59 and 61 is a three arm lever 484 (Fig. 6). The rear arm rests on a shoulder 485 of the bell hammer 483. The upper arm rests against the rod 482, and the lower arm co-operates with a rod 486 in a manner to be hereinafter described. Connecting the lever 484 and the bell hammer 483 is a coil spring 487.

When the lever 61 is rocked counter-clockwise the lever 484 is moved downwardly with said lever 61, consequently the rear arm of said lever 484 is disengaged from the shoulder 485 on the bell hammer 483 and caused to engage a shoulder 488 on the bell hammer. When the lever 61 is rocked clockwise to its normal position the rear arm of the lever 484 causes the bell hammer 483 to be rocked clockwise, thereby putting a tension upon the spring 487. Just before the lever 61 reaches its normal position the rear arm of the lever 484 slides off the shoulder 488 and again engages the shoulder 485. When this occurs the spring 487 quickly rocks the bell hammer 483 counter-clockwise, thereby causing its upper end to strike the bell. The pivotal point of the bell hammer 483 being an elongated slot 489, causes the hammer when in the act of striking the bell to pivot at point 490. This being the pivotal point, it also causes the hammer to again be moved away from the bell and held away in order that the bell may "ring" after being struck. If it is desired to muffle both of the bells, the rod 486 is turned so that its true periphery is positioned against the lower arm of the lever 484. When this is done the lever 484 cannot be rocked clockwise to have its rearward arm engage the shoulder 488 on the bell hammer 483. Therefore, when the lever 61 is rocked clockwise to normal position, the forward arm of the lever will not rock the hammer 483 clockwise, therefore, no tension will be put upon the spring 487 and the hammer 483 will not strike the bell.

"B's" lever 59 carries a lever like the lever 484 which co-operates with mechanism for ringing the bell 481, but as this mechanism is exactly like that just described it is not thought necessary to describe it herein.

While the form of mechanism herein shown and described, is admirably adapted to fulfill the objects primarily stated, it is to be understood that it is not intended to confine the invention to the one form of embodiment herein disclosed, for it is susceptible of embodiment in various forms all coming within the scope of the claims which follow.

What is claimed is:

1. In a machine of the class described, the combination of manipulative devices, a group of indicator tablets, tablet selecting means including a member having a cam slot and a member projecting therein for moving the group from a previously set position directly to a new position, and a third member connected to and operated by said devices said third member having a similar cam slot and receiving said projecting member for controlling said selecting means.

2. In a machine of the class described, the combination of manipulative devices, a group of indicator tablets, a carrier for the group of tablets, means including a member having a cam slot and a member projecting therein for moving said carrier from any previously set position to select any tablet, and means connected to and operated by said devices and having a like cam slot for receiving said projecting member for controlling said moving means.

3. In a machine of the class described, the combination of manipulative devices, indicator tablets, tablet carrying mechanism, a member having a cam slot said member being connected to and operated by the manipulative devices for controlling the movement of said carrying mechanism, and means including a member having an identical cam slot and a projection engaging both of said slots for moving said carrying mechanism directly from one position to any other position to select a tablet, said other position being in accordance with the manipulative device operated.

4. In a machine of the class described, the combination of manipulative devices, indicators, indicator carrying mechanism, means including a member having a cam slot and a projection engaging said slot for moving said carrying mechanism from any one position directly to any other position to select an indicator, means having a like cam slot for receiving said projection and differentially positioned directly by said devices for controlling said moving means so that the indicator selected corresponds to the device operated, and means operated by any of said devices for moving the selected indicator to expose it to view.

5. In a machine of the class described, the combination of manipulative devices, indicator tablets, tablet carrying mechanism, a member having a cam slot for differentially positioning said carrying mechanism from any previously set position directly to a new position to select any tablet, means engaging said cam slot a device connected to and operated by said manipulative devices and having a similar cam slot for engaging said means to control said positioning means whereby the tablet selected corresponds to the manipulative device operated, and means for moving the selected tablet to expose the indicia thereon.

6. In a machine of the class described, the combination of manipulative devices, indicators, indicator carrying mechanism, means for moving said carrying mechanism from any one position directly to any other position to select a new indicator, means actuated by said manipulative devices for controlling said moving means, and means operated by said moving means to move the selected indicator to expose it to view.

7. In a machine of the class described, the combination of manipulative item determining devices, indicators, indicator carrying mechanism, a differentially adjustable actuator therefor, means adapted to be moved varying distances by the manipulative devices, means adapted to be moved a definite distance by the manipulative devices, and a member common to the said actuator and the first mentioned means and connected to the second mentioned means and moved thereby to adjust the actuator differentially depending upon the movement of the first mentioned means.

8. In a machine of the class described, the combination of manipulative item determining devices, indicators, indicator carrying mechanism, a differentially adjustable actuator therefor, means adapted to be moved varying distances by the manipulative devices, means adapted to be moved a definite distance by the manipulative devices, a member common to said actuator and the first mentioned means and connected to the second mentioned means and moved thereby to adjust the actuator differentially depending upon the movement of the first mentioned means for selecting an indicator, and means operated by the second mentioned means for exposing the selected indicator to view.

9. In a machine of the class described, the combination of manipulative amount determining devices, indicating mechanism comprising parallel tablets adapted to be moved back and forth, a totalizer, an actuator operated by said devices for actuating the totalizer, and for controlling the movement of said tablets either backward or forward, and means operated by said devices for moving said indicating mechanism as determined by the position of said actuator to select one of the tablets.

10. In a machine of the class described, the combination of manipulative devices, a totalizer, indicators, indicator carrying mechanism, an actuator having a cam slot and operated by said devices for actuating the totalizer and for controlling differential movement of said indicator carrying mechanism, a member engaging said cam slot, means having a similar slot engaged by said member for moving said carrying mechanism from any previously set position directly to any new position to select an indicator as determined by the position of said actuator, and means for moving the selected indicator to expose it to view.

11. In a machine of the class described, the combination of manipulative devices, indicators, indicator carrying mechanism, an actuator engaged by and operated by said devices for actuating the totalizer and for controlling differential movement of said carrying mechanism, means for moving the carrying mechanism in either direction as determined by the position of said actuator, and means operated by any of said devices for moving the selected indicator to expose it to view.

12. In a machine of the class described, the combination of groups of manipulative devices, groups of indicators, indicator carrying mechanisms one for each group of indicators, differentially adjustable actuators for said carrying mechanisms, means associated with each group of manipulative devices and adapted to be moved varying distances thereby, means common to all of the groups of manipulative devices and adapted to be moved a definite distance thereby, a plurality of members each common to the first mentioned means and the actuator associated therewith, all of said members being connected to said common means and moved thereby to adjust said actuators differentially depending upon the movements of the first mentioned means and for selecting an indicator in each group corresponding to the operated devices, and means for exposing the selected indicators to view.

13. In a machine of the class described, the combination of groups of manipulative devices, groups of indicators, indicator carrying mechanism for each group of indicators, differentially adjustable actuators, means associated with each group of manipulative devices and adapted to be moved varying distances thereby, means common to all of the groups of manipulative devices and adapted to be moved a definite distance thereby, a plurality of members each common to the first mentioned means and the actuator associated therewith, all of said members being connected to said common means and moved thereby to adjust said actuators differentially depending upon the movements of the first mentioned means for selecting an indicator in each group corresponding to the operated devices, and means common to all of the indicators in all of the groups and operated by said common means to expose the selected indicators to view.

14. In a machine of the class described, the combination of manipulative devices, indicators, indicator carrying mechanism, a differentially adjustable actuator therefor, indicator exposing means, an aligning device adapted to align said mechanism in any of its various positions, and a member operated by the manipulative devices to operate the indicator exposing means to expose the indicator and the aligning device to engage it with the indicating mechanism.

15. In a machine of the class described, the combination of manipulative devices, indicators, indicator carrying mechanism, a differentially adjustable actuator therefor, indicator raising and lowering means, an aligning device adapted to align said mechanism in any of its various positions, and an oscillatory means operated by the manipulative devices to lower the indicator raising and lowering means and cause the aligning device to be released and then again locked to positively align the indicator carrying mechanism in the new position to which it has been differentially adjusted when said oscillatory means is moved in one direction and when moved in the other direction to raise the indicator raising and lowering means to expose the selected indicator to view.

16. In a machine of the class described, the combination of manipulative devices, indicators, an oscillating indicator carrying mechanism, a totalizer, an actuator directly connected to and operated by said devices for actuating the totalizer and for controlling differential movement of the indicator carrying mechanism, means for moving said carrying mechanism from any previously set position directly to any new position to select an indicator as determined by the position of said actuator, means operated by said devices for operating said moving means, and means for moving the selected indicator to expose it to view.

17. In a machine of the class described, the combination of manipulative devices, indicators, indicator carrying mechanism, a totalizer, an actuator operated by said devices for actuating said totalizer and for controlling differential movement of said indicator carrying mechanism, means for moving said carrying mechanism in either of two directions as determined by said actuator to select a totalizer, means for operating said moving means, and means operated by any of said devices for moving the selected indicator to expose it to view.

18. In a machine of the class described, the combination of manipulative devices, indicators, indicator carrying mechanism, two members having identical apertures and adapted to be moved differentially, and a device projecting into both apertures, said device being controlled by one of said members determined by the manipulative devices and controlling the other member to position the indicator carrying mechanism according to the manipulative device operated.

In testimony whereof we affix our signatures.

FREDERICK L. FULLER.
WILLIAM H. ROBERTSON.